United States Patent
Nishimoto et al.

(10) Patent No.: US 8,854,304 B2
(45) Date of Patent: Oct. 7, 2014

(54) IMAGE GENERATION SYSTEM, IMAGE GENERATION METHOD, AND INFORMATION STORAGE MEDIUM

(75) Inventors: Yasuhiro Nishimoto, Yokohama (JP); Chihiro Kozasa, Yokohama (JP); Tadashi Sakakibara, Tokyo (JP); Daisuke Sekioka, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 222 days.

(21) Appl. No.: 13/158,000

(22) Filed: Jun. 10, 2011

(65) Prior Publication Data

US 2011/0304540 A1 Dec. 15, 2011

(30) Foreign Application Priority Data

Jun. 11, 2010 (JP) ................. 2010-134585

(51) Int. Cl.
*G06F 3/033* (2013.01)
*A63F 13/20* (2014.01)

(52) U.S. Cl.
CPC ......... *A63F 13/06* (2013.01); *A63F 2300/6692* (2013.01); *A63F 2300/1093* (2013.01); *A63F 2300/6045* (2013.01); *A63F 2300/308* (2013.01)
USPC ............................ 345/158; 345/157; 715/863

(58) Field of Classification Search
USPC .............. 463/36, 31; 715/706, 781, 856, 857, 715/861–863
See application file for complete search history.

(56) References Cited

U.S. PATENT DOCUMENTS

| | | | |
|---|---|---|---|
| 5,594,469 A | 1/1997 | Freeman et al. | |
| 6,266,061 B1 | 7/2001 | Doi et al. | |
| 8,284,157 B2 * | 10/2012 | Markovic et al. | 345/156 |
| 2001/0024213 A1 | 9/2001 | Doi et al. | |
| 2004/0155962 A1 * | 8/2004 | Marks | 348/169 |
| 2011/0230266 A1 | 9/2011 | Yamaguchi | |

FOREIGN PATENT DOCUMENTS

| | | |
|---|---|---|
| EP | 1 774 996 A1 | 4/2007 |
| JP | A-10-207619 | 8/1998 |
| JP | A-2008-136695 | 6/2008 |
| JP | A-2011-189066 | 9/2011 |

OTHER PUBLICATIONS

U.S. Appl. No. 13/157,953, filed Jun. 10, 2011 in the name of Yasuhiro Nishimoto et al.

(Continued)

*Primary Examiner* — Lun Yi Lao
*Assistant Examiner* — Ibrahim Khan
(74) *Attorney, Agent, or Firm* — Oliff PLC

(57) ABSTRACT

An image generation system includes an image information acquisition section that acquires image information from an image sensor, a motion information acquisition section that acquires motion information about an operator based on the image information from the image sensor, an object control section that moves an object in a movement area based on the motion information about the operator, and an image generation section that generates an image displayed on a display section. The object control section limits movement of the object so that the object does not move beyond a movement limiting boundary set in the movement area even when it has been determined that the object has moved beyond the movement limiting boundary based on the motion information.

16 Claims, 26 Drawing Sheets

(56) References Cited

OTHER PUBLICATIONS

U.S. Appl. No. 13/158,003, filed Jun. 10, 2011 in the name of Yasuhiro Nishimoto et al.

U.S. Appl. No. 13/157,986, filed Jun. 10, 2011 in the name of Yasuhiro Nishimoto et al.

Why does the mouse only disappear on two sides of the screen?, Yahoo Answers, Dec. 16, 2009, http://answers.yahoo.com/question/index?qid=20100220192750AAZsoPN.

Kinect, Wikipedia, Jun. 10, 2020, http://en.wikipedia.org/w/index.php?title-Kinect&oldid-367203605.

Jan. 14, 2014 Search Report issued in European Patent Application No. 11169649.8-1905.

\* cited by examiner

COLOR IMAGE INFORMATION

DEPTH INFORMATION

DEPTH INFORMATION

SKELETON INFORMATION

IMAGE SENSOR

DISPLAY SECTION

FIG. 17A

SKELETON INFORMATION

| BONE (JOINT) | POSITION INFORMATION |
|---|---|
| C0(WAIST) | XC0, YC0, ZC0 |
| C1(CHEST) | XC1, YC1, ZC1 |
| C2(NECK) | XC2, YC2, ZC2 |
| ... | ... |

FIG. 17B

RELIABILITY INFORMATION

| BONE (JOINT) | RELIABILITY |
|---|---|
| C0 | DC0 |
| C1 | DC1 |
| C2 | DC2 |
| ... | ... |

RELIABILITY IS HIGH

RELIABILITY IS LOW

IMAGE GENERATION SYSTEM, IMAGE GENERATION METHOD, AND INFORMATION STORAGE MEDIUM

Japanese Patent Application No. 2010-134585 filed on Jun. 11, 2010, is hereby incorporated by reference in its entirety.

BACKGROUND

The present invention relates to an image generation system, an image generation method, an information storage medium, and the like.

A game device that allows the player to perform a game operation using a controller provided with a motion sensor instead of a controller provided with an operation button and a direction key, has been popular. A game device having such an operation interface allows the operator (player or user) to perform an intuitive operation input, and can simplify the game operation, for example. JP-A-2008-136695 discloses a game device that enables such an intuitive interface, for example.

Such an intuitive interface may also be implemented by capturing the operator using an image sensor, and implementing an operation input based on the motion of the operator.

However, when extracting the motion of the hand or the like of the operator using the image sensor, and moving an object on the screen, the object may make an unintended motion.

SUMMARY

According to one aspect of the invention, there is provided an image generation system comprising:

an image information acquisition section that acquires image information from an image sensor;

a motion information acquisition section that acquires motion information about an operator based on the image information from the image sensor;

an object control section that moves an object in a movement area based on the motion information about the operator; and an image generation section that generates an image displayed on a display section, the object control section limiting movement of the object so that the object does not move beyond a movement limiting boundary that is set in the movement area even when it has been determined that the object has moved beyond the movement limiting boundary based on the motion information.

According to another aspect of the invention, there is provided an image generation method comprising:

acquiring image information from an image sensor;

acquiring motion information about an operator based on the image information from the image sensor;

moving an object in a movement area based on the motion information about the operator; generating an image displayed on a display section; and limiting movement of the object so that the object does not move beyond a movement limiting boundary set in the movement area even when it has been determined that the object has moved beyond the movement limiting boundary based on the motion information.

According to another aspect of the invention, there is provided a computer-readable information storage medium storing a program that causes a computer to execute the above image generation method.

BRIEF DESCRIPTION OF THE DRAWINGS

FIG. 3 is a view illustrative of a method that calculates skeleton information about an operator based on depth information and the like.

FIGS. 17A and 17B are views illustrative of an example of the data structure of skeleton information and reliability information.

DESCRIPTION OF EXEMPLARY EMBODIMENTS

Figure 1:
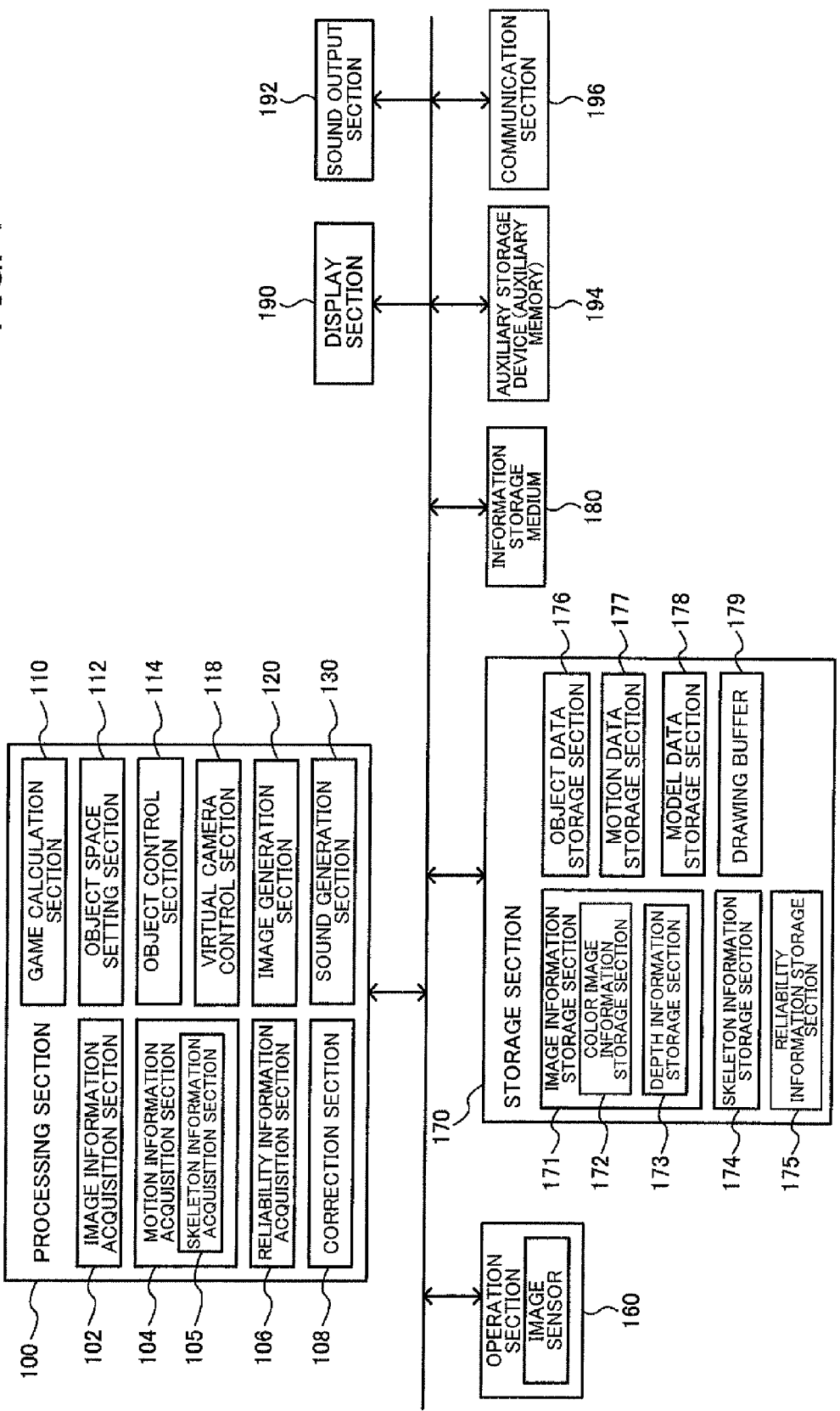
FIG. 1 shows a configuration example of an image generation system according to one embodiment of the invention.

Several aspects of the invention may provide an image generation system, an image generation method, an information storage medium, and the like that can appropriately control an object that moves based on motion information about an operator.

According to one embodiment of the invention, there is provided an image generation system comprising:

an image information acquisition section that acquires image information from an image sensor;

a motion information acquisition section that acquires motion information about an operator based on the image information from the image sensor;

an object control section that moves an object in a movement area based on the motion information about the operator; and an image generation section that generates an image displayed on a display section, the object control section limiting movement of the object so that the object does not move beyond a movement limiting boundary that is set in the movement area even when it has been determined that the object has moved beyond the movement limiting boundary based on the motion information.

According to one embodiment of the invention, the image information is acquired from the image sensor, and the motion information about the operator is acquired based on the image information. The object is moved in the movement area based on the motion information. In this case, the movement of the object is limited so that the object does not move beyond the movement limiting boundary even when it has been determined that the object has moved beyond the movement limiting boundary based on the motion information. The object that moves based on the motion information about the operator can be appropriately controlled by limiting the movement of the object so that the object does not move beyond the movement limiting boundary.

In the image generation system, the object control section may limit movement of the object so that the object does not move beyond the movement limiting boundary that is set corresponding to a plurality of contact target objects that are contact targets of the object.

According to the above configuration, since the movement of the object is limited so that the object does not move beyond the movement limiting boundary that is set corresponding to the plurality of contact target objects, a contact event between the object and the contact target object easily occurs when controlling the movement of the object based on the motion information about the operator.

In the image generation system, the plurality of contact target objects may be disposed in an object side area with respect to the movement limiting boundary; and the object control section may limit movement of the object so that the object does not move beyond the movement limiting boundary that is set to be circumscribed to the plurality of contact target objects.

According to the above configuration, since the movement of the object is limited so that the object does not move beyond the movement limiting boundary that is set to be circumscribed to the plurality of contact target objects, sequential contact events between the object and the plurality of contact target objects easily occurs, for example.

In the image generation system, a first movement area and a second movement area may be set as the movement area; and the object control section may move a first object in the first movement area, may move a second object in the second movement area, and may limit movement of the first object and the second object so that the first object and the second object do not move beyond the movement limiting boundary that is set between the first movement area and the second movement area.

According to the above configuration, the first object can be moved in the first movement area, and the second object can be moved in the second movement area. It is possible to limit the movement of the first object and the second object so that the first object does not enter the second movement area across the movement limiting boundary, and the second object does not enter the first movement area across the movement limiting boundary. Specifically, the first object can be moved only in the first movement area, and the second object can be moved only in the second movement area.

In the image generation system, the object control section may control movement of the first object in the first movement area based on the motion information about a first part of the operator, and may control movement of the second object in the second movement area based on the motion information about a second part of the operator.

According to the above configuration, the first object is moved in the first movement area based on the motion of the first part of the operator, and the second object is moved in the second movement area based on the motion of the second part of the operator. This makes it possible for the operator to move the first object and the second object by separately moving the first part and the second part, so that a novel operation interface environment can be implemented.

In the image generation system, the object control section may limit movement of the object so that the object does not move beyond a screen-edge movement limiting boundary provided corresponding to an edge of a screen of the display section.

This makes it possible to prevent a situation in which the object moves beyond the screen-edge movement limiting boundary, and disappears from the screen.

In the image generation system, the screen-edge movement limiting boundary may be provided outside the edge of the screen.

This makes it possible to move the object over a wide moving range, so that an open operation interface environment can be implemented.

In the image generation system, a distance between the screen-edge movement limiting boundary and the edge of the screen may be smaller than a width of the object.

According to the above configuration, at least part of the object is displayed on the screen when the object has moved to an area around the edge of the screen. This makes it possible to prevent a situation in which the operator loses sight of the object.

In the image generation system, the motion information acquisition section may acquire skeleton information that specifies a motion of the operator as the motion information; and the object control section may move the object in the movement area based on the skeleton information.

This makes it possible to control the movement of the object based on the motion of the part of the operator, for example.

The image generation system may further comprise:

a correction section that performs a correction process on position information about a bone of a skeleton indicated by the skeleton information, the object control section may control the object based on a result of the correction process.

This makes it possible to generate various images by utilizing the skeleton information about the operator. For example, it is possible to deal with various operators who differ in physique or the like.

In the image generation system, the correction section may performing the correction process on the position information about the bone of the skeleton to obtain corrected position information;

the object control section may control the object based on the corrected position information; and the image generation section may generate an image so that the object is displayed at a display position on a screen corresponding to the corrected position information.

This makes it possible to perform the correction process on the position information about the bone of the skeleton, and display the object at a display position corresponding to the corrected position information.

In the image generation system, the correction section may perform the correction process so that a display position of the object when a skeleton of a first operator is in a first state is identical with a display position of the object when a skeleton of a second operator is in the first state.

This makes it possible to control the object irrespective of whether the operator is the first operator or the second operator.

In the image generation system, the correction section may perform the correction process using physique information about the operator.

This makes it possible to reflect the physique information about the operator in the correction process. Therefore, a correction process that absorbs the difference in physique or the like between the operators can be implemented.

The image generation system may further comprise:

a reliability information acquisition section that acquires reliability information that indicates reliability of the skeleton information, the image generation section may generate an image corresponding to the acquired reliability information as the image displayed on the display section.

This makes it possible to reflect the reliability of the skeleton information in the image displayed on the display section. Therefore, a novel image generation system can be provided.

In the image generation system, the image generation section may change a display state of the image displayed on the display section based on the reliability information.

According to the above configuration, since the display state of the image displayed on the display section changes when the reliability indicated by the reliability information has increased or decreased, it is possible to notify the operator of an increase or a decrease in reliability through a change in display state of the image.

According to another embodiment of the invention, there is provided an image generation method comprising:

acquiring image information from an image sensor;

acquiring motion information about an operator based on the image information from the image sensor;

moving an object in a movement area based on the motion information about the operator;

generating an image displayed on a display section; and limiting movement of the object so that the object does not move beyond a movement limiting boundary set in the movement area even when it has been determined that the object has moved beyond the movement limiting boundary based on the motion information.

According to another embodiment of the invention, there is provided a computer-readable information storage medium storing a program that causes a computer to execute the above image generation method.

Exemplary embodiments of the invention are described below. Note that the following exemplary embodiments do not in any way limit the scope of the invention laid out in the claims. Note that all elements of the following embodiments should not necessarily be taken as essential requirements for the invention.

1. Configuration

FIG. 1 shows an example of a block diagram of an image generation system (game device or visual instrument) according to one embodiment of the invention. Note that the image generation system according to one embodiment of the invention is not limited to the configuration shown in FIG. 1. Various modifications may be made, such as omitting some of the elements (sections) or adding other elements (sections).

An operation section 160 allows the operator to input operation information. The operation section 160 includes an image sensor that is implemented by a color image sensor, a depth sensor, or the like. The function of the operation section 160 may be implemented by only the image sensor, or may be implemented by the image sensor and an operation device (e.g., direction key, an operation button, an analog stick, a lever, a sensor (e.g., angular velocity sensor or acceleration sensor), a microphone, or a touch panel display) other than the image sensor.

A storage section 170 serves as a work area for a processing section 100, a communication section 196, and the like. The function of the storage section 170 may be implemented by a RAM (DRAM or VRAM) or the like. A game program and game data that is necessary when executing the game program are stored in the storage section 170.

An information storage medium 180 (computer-readable medium) stores a program, data, and the like. The function of the information storage medium 180 may be implemented by an optical disk (DVD), a hard disk drive (HDD), a memory (e.g., ROM), or the like. The processing section 100 performs various processes according to one embodiment of the invention based on a program (data) stored in the information storage medium 180. Specifically, a program that causes a computer (i.e., a device including an operation section, a processing section, a storage section, and an output section) to function as each section according to one embodiment of the invention (i.e., a program that causes a computer to execute the process of each section) is stored in the information storage medium 180.

A display section 190 outputs an image generated according to one embodiment of the invention. The function of the display section 190 may be implemented by an LCD, an organic EL display, a CRT, a touch panel display, a head mount display (HMD), or the like. A sound output section 192 outputs sound generated according to one embodiment of the invention. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) via a cable or wireless network. The function of the communication section 196 may be implemented by hardware such as a communication ASIC or a communication processor, or communication firmware.

A program (data) that causes a computer to function as each section according to one embodiment of the invention may be distributed to the information storage medium 180 (or the storage section 170 or the auxiliary storage device 194) from an information storage medium included in a server (host device) via a network and the communication section 196. Use of the information storage medium included in the server (host device) is also intended to be included within the scope of the invention.

The processing section 100 (processor) performs a game process, an image generation process, a sound generation process, and the like based on the operation information from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

The processing section 100 includes an image information acquisition section 102, a motion information acquisition section 104, a reliability information acquisition section 106, a correction section 108, a game calculation section 110, an object space setting section 112, an object control section 114, a virtual camera control section 118, an image generation section 120, and a sound generation section 130. Note that various modifications may be made, such as omitting some of these elements or adding other elements.

The image information acquisition section 102 acquires image information from the image sensor. For example, information about an image captured by the image sensor is stored in an image information storage section 171 included in the storage section 170. Specifically, information about a color image captured by the color image sensor of the image sensor is stored in a color image information storage section 172, and information about a depth image captured by the depth sensor of the image sensor is stored in a depth information storage section 173. The image information acquisition section 102 reads (acquires) the image information from the image information storage section 171.

The motion information acquisition section 104 acquires motion information about the operator. A skeleton information acquisition section 105 included in the motion information acquisition section 104 acquires skeleton information, and the reliability information acquisition section 106 acquires reliability information about the skeleton information. The skeleton information is stored in a skeleton information storage section 174, and the reliability information is stored in a reliability information storage section 175. The correction section 108 performs various correction processes. The details of the motion information acquisition section 104, the skeleton information acquisition section 105, the reliability information acquisition section 106, and the correction section 108 are described later.

The game calculation section 110 performs a game calculation process. The game calculation process includes starting the game when game start conditions have been satisfied, proceeding with the game, calculating the game results, and finishing the game when game finish conditions have been satisfied, for example.

The object space setting section 112 sets an object space where a plurality of objects are disposed. For example, the object space setting section 112 disposes an object (i.e., an object formed by a primitive surface such as a polygon, a free-form surface, or a subdivision surface) that represents a display object such as a character (e.g., human, animal, robot, car, ship, or airplane), a map (topography), a building, a course (road), a tree, or a wall in the object space. When the object is a three-dimensional object, the object space setting section 112 determines the position and the rotation angle (synonymous with orientation or direction) of the object in a world coordinate system, and disposes the object at the determined position (X, Y, Z) and the determined rotation angle (rotation angles around X, Y, and Z axes). More specifically, an object data storage section 176 of the storage section 170 stores an object number, and object data (e.g., the position, rotation angle, moving speed, and moving direction of the object (part object)) that is linked to the object number. The object space setting section 112 updates the object data every frame, for example.

The object control section 114 controls the object. For example, the object control section 114 controls at least one of the movement and the motion of the object based on the operation information input by the player using the operation section 160, a program (movement/motion algorithm), various types of data, and the like. More specifically, the object control section 114 performs a simulation process that sequentially calculates movement information (position, rotation angle, speed, or acceleration) about the object every frame (e.g., 1/60th of a second). The object control section 114 also performs a motion process, an animation process, and the like on the object. The term "frame" refers to a time unit used when performing the object movement/motion process or the image generation process.

The object controlled by the object control section 114 may be a three-dimensional object disposed in a three-dimensional object space, or may be a two-dimensional object drawn on a two-dimensional screen (display screen). When the object is an object of a character indicated by a three-dimensional model, the object control section 114 performs a motion process (motion replay or motion generation) that causes the character to make a motion. The motion process may be implemented by reproducing the motion of the character based on motion data stored in a motion data storage section 177, for example. The motion data storage section 177 stores the motion data including the position or the rotation angle (i.e., the rotation angles of a child bone around three axes with respect to a parent bone) of each bone that forms the skeleton of the character (model object) (i.e., each part object that forms the character). A model data storage section 178 stores model data about the model object that indicates the character.

The virtual camera control section 118 controls a virtual camera (viewpoint or reference virtual camera) for generating an image viewed from a given (arbitrary) viewpoint in the object space. Specifically, the virtual camera control section 118 controls the position (X, Y, Z) or the rotation angle (rotation angles around X, Y, and Z axes) of the virtual camera (i.e., controls the viewpoint position, the line-of-sight direction, or the angle of view).

The image generation section 120 performs a drawing process based on the result of various processes (game process and simulation process) performed by the processing section 100 to generate an image, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or α-value) based on the result of the geometric process. The image generation section 120 draws the object (one or more primitive surfaces) subjected to perspective transformation in a drawing buffer 179 (i.e., a buffer (e.g., frame buffer or work buffer) that can store image information in pixel units) based on the drawing data (primitive surface data). The image generation section 120 thus generates an image viewed from the virtual camera (given viewpoint) in the object space. The drawing process may be implemented by a vertex shader process or a pixel shader process.

The image generation section 120 may generate a stereoscopic image. In this case, a left-eye virtual camera and a right-eye virtual camera are disposed using a reference virtual camera position and a reference inter-camera distance. The image generation section 120 generates a left-eye image viewed from the left-eye virtual camera in the object space, and generates a right-eye image viewed from the right-eye virtual camera in the object space. Stereoscopic vision may be implemented by a stereoscopic glass method or a naked-eye method using a lenticular lens or the like by utilizing the left-eye image and the right-eye image.

The sound generation section 130 performs a sound process based on the result of various processes performed by the processing section 100 to generate game sound (e.g., background music (BGM), effect sound, or voice), and outputs the generated game sound to the sound output section 192.

When the image information acquisition section 102 has acquired the image information from the image sensor, the motion information acquisition section 104 acquires motion information about the operator. The object control section 114 moves the object based on the motion information.

Example of the motion information include optical flow information (e.g., motion vector), information that indicates the motion of each part of the operator, skeleton information about the operator, and the like. The optical flow information indicates the motion of the operator in a captured image that has been captured by the image sensor using a motion vector. The information that indicates the motion of each part of the operator specifies the motion of each part of the operator. The skeleton information specifies the motion of the operator viewed from the image sensor. The skeleton information includes a plurality of pieces of joint position information corresponding to a plurality of joints of the operator. Each of the plurality of pieces of joint position information includes three-dimensional coordinate information. Each joint connects bones, and a skeleton is formed by connecting a plurality of bones. The joint position information is used as position information about the bone.

The object control section 114 moves the object in a movement area (operation field) based on the motion information about the operator. For example, when the skeleton information acquisition section 105 included in the motion information acquisition section 104 has acquired the skeleton information that specifies the motion of the operator as the motion information, the object control section 114 moves the object in the movement area based on the skeleton information. For example, the object control section 114 specifies the motion of a given part (e.g., hand or foot) of the operator using the skeleton information, and moves the object in the same manner as (based on the motion of) the given part. The object may be a two-dimensional object or a three-dimensional object. The movement area may be a two-dimensional area or a three-dimensional area.

The object control section 114 limits the movement of the object so that the object does not move beyond a movement limiting boundary. Specifically, when it has been determined that the object has moved beyond the movement limiting boundary set in the movement area based on the motion information (skeleton information), the object control section 114 limits the movement of the object so that the object does not move beyond the movement limiting boundary. For example, the object control section 114 determines whether or not the object has moved beyond the movement limiting boundary based on the motion information, and sets the position of the object to a position around the movement limiting boundary when it has been determined that the object has moved beyond the movement limiting boundary.

The movement limiting boundary may be a two-dimensional line or a three-dimensional plane. The movement limiting boundary may be implemented by data that specifies the position of the movement limiting boundary, or the object control section 114 may set the movement limiting boundary by a mathematical process or the like. The movement of the object may be limited by stopping the object at the movement limiting boundary (around the movement limiting boundary), or the object may be allowed to move beyond the movement limiting boundary to some extent.

The object control section 114 limits the movement of the object so that the object does not move beyond a movement limiting boundary that is set corresponding to a plurality of contact target objects (hit target objects or play target objects) that are contact targets of the object. For example, when a plurality of contact target objects are disposed in an object side area with respect to the movement limiting boundary (i.e., disposed on the inner circumferential side of the movement limiting boundary), the object control section 114 limits the movement of the object so that the object does not move beyond the movement limiting boundary that is set to be (almost) circumscribed to the plurality of contact target objects. In this case, the shape, the placement, and the like of the movement limiting boundary may be variably set based on a change in position of the plurality of contact target objects.

When a first movement area and a second movement area are set as the movement area, the object control section 114 moves a first object in the first movement area, and moves a second object in the second movement area. For example, the object control section 114 moves the first object only in the first movement area, and moves the second object only in the second movement area.

The object control section 114 limits the movement of the first object and the second object so that the first object and the second object do not move beyond a movement limiting boundary set between the first movement area and the second movement area. For example, the object control section 114 limits the movement of the first object and the second object so that the first object does not enter the second movement area across the movement limiting boundary, and the second object does not enter the first movement area across the movement limiting boundary. The number of movement areas is not limited to two, but may be three or more (first to Nth movement areas).

The object control section 114 controls the movement of the first object in the first movement area based on the motion information about a first part of the operator, and controls the movement of the second object in the second movement area based on the motion information about a second part of the operator. For example, the first part is the right hand (or the right foot or the like) of the operator, and the motion information about the first part may be obtained based on the position information about the bone of the right hand of the skeleton of the operator. For example, the second part is the left hand (or the left foot or the like) of the operator, and the motion information about the second part may be obtained based on the position information about the bone of the left hand of the skeleton of the operator. In this case, the first object is a right hand object (cursor or icon) corresponding to the right hand, and the second object is a left hand object (cursor or icon) corresponding to the left hand.

The object control section 114 may limit the movement of the object so that the object does not move beyond a screen-edge movement limiting boundary provided corresponding to an edge (end) of a screen on which an image is displayed. The screen-edge movement limiting boundary may be provided corresponding to at least one of the left edge, the right edge, the upper edge, and the lower edge of the screen (drawing screen), for example. The screen-edge movement limiting boundary may be provided corresponding to each of the left edge, the right edge, the upper edge, and the lower edge of the screen, for example.

The screen-edge movement limiting boundary may be provided at the edge (left edge, right edge, upper edge, and/or lower edge) of the screen, or may be provided outside the edge of the screen (on the outer circumferential side). When providing the screen-edge movement limiting boundary outside the edge of the screen, it is desirable that the distance between the screen-edge movement limiting boundary and the edge of the screen be smaller than the width (minimum width) of the object. According to this configuration, part of the object is displayed on the screen even when the object moves around the edge of the screen.

The skeleton information acquisition section 105 acquires the skeleton information about the operator based on the image information from the image sensor. The correction section 108 then performs a correction process on the position information (joint position information) about the bone of the skeleton indicated by the skeleton information, and the image generation section 120 generates an image based on the result of the correction process. The correction process performed on the position information about the bone may be a correction process performed on the position information about the bone, or may be a correction process that corrects another information to obtain a similar effect as in the case of correcting the position information about the bone. The image generation section 120 generates an image that reflects the result of the correction process performed on the position information about the bone, and displays the image on the display section 190.

Specifically, the correction section 108 performs the correction process on the position information (joint position information) about the bone of the skeleton to obtain corrected position information. The object control section 114 controls the object based on the corrected position information obtained by the correction process. For example, the object control section 114 determines the drawing position or the like of the object based on the corrected position information. The image generation section 120 generates an image so that the object is displayed at a display position on the screen corresponding to the corrected position information. An image based on the result of the correction process (i.e., an image that reflects the correction process) is thus generated.

The object moves based on the motion of a given part (e.g., hand or foot) of the operator. Specifically, the given part may be the hand of the operator, and the object may be a hand object (icon or cursor) that moves based on the motion of the hand of the operator.

The correction section 108 performs the correction process so that the display position of the object when the skeleton of a first operator is in a first state is identical with the display position of the object when the skeleton of a second operator is in the first state. For example, when the first operator is an adult, and the second operator is a child, the correction section 108 performs the correction process so that the display position of the object (e.g., right hand object) when the skeleton of the adult operator is in the first state (e.g., the right hand is raised) is identical with the display position of the object when the skeleton of the child operator is in the first state.

The correction section 108 may perform the correction process using physique information about the operator. The physique information indicates the size, the shape, and the like of the body of the operator. Specifically, the correction section 108 may perform the correction process using joint distance information that indicates the distance between a first joint (e.g., shoulder joint) and a second joint (e.g., joint of the hand) of the skeleton as the physique information. Alternatively, the correction section 108 may perform the correction process using distance information obtained from joint-to-joint distance information acquired over a plurality of frames. For example, the correction section 108 averages the joint-to-joint distance information acquired over a plurality of frames, and performs the correction process using the resulting distance information.

The correction section 108 may determine the angle formed by a first direction that connects the position (representative position) of the operator with the image sensor and a second direction that connects the position of the operator with the position of a joint corresponding to a given part (e.g., hand or foot) of the operator, and may then perform the correction process. For example, the correction section 108 calculates the display position of the object based on the determined angle. This makes it possible to calculate the drawing position of the object without calculating the corrected position information directly from the position information about the bone.

The reliability information acquisition section 106 acquires reliability information that indicates the reliability of the skeleton information. The image generation section 120 generates an image corresponding to the acquired reliability information as an image displayed on the display section 190. For example, the image generation section 120 changes the display state of the image displayed on the display section 190 based on the reliability information. When the game calculation section 110 has performed the game calculation process based on the reliability information, or the object control section 114 has performed the object control process based on the reliability information, the image generation section 120 generates an image based on the reliability information by generating an image based on the game calculation process or the object control process.

For example, the reliability information acquisition section 106 acquires the reliability information in which the reliability of the information about each bone (position information or link (relationship) information) is linked to each bone (joint) of the skeleton indicated by the skeleton information the information. The skeleton information includes the position information about each bone (each joint) that is linked to each part (e.g., hand, foot, waist, trunk, neck, or head) of the operator. In this case, the reliability indicated by the reliability information indicates the reliability of a link (relationship) between each part and each bone of the operator and the position information about each bone.

The reliability information acquisition section 106 acquires the reliability information in which the reliability of information (position information or link information) about the bone corresponding to a given part (e.g., hand or foot) of the operator decreases as the given part approaches another part (e.g., trunk, head, or the other hand or foot) of the operator. Specifically, the reliability information acquisition section 106 acquires the reliability information in which the reliability decreases when the given part cannot be distinguished from another part. Alternatively, the reliability information acquisition section 106 acquires the reliability information in which the reliability of the information about the bone included in the skeleton information decreases when the operator is positioned at a distance equal to or longer than a given distance from the image sensor. Specifically, the reliability information acquisition section 106 acquires the reliability information in which the reliability information decreases when the operator is positioned away from the image sensor, and it is impossible (or very difficult) to acquire the reliability information from the image information from the image sensor. The skeleton information and the reliability information may be integrated.

The image generation section 120 changes the display state of the image displayed on the display section 190 based on the acquired reliability information. In this case, the image generation section 120 may change the display state of the image displayed on the display section 190 based on prediction information (e.g., change rate information) about a change in reliability indicated by the reliability information. For example, the image generation section 120 changes the display state of the image when it has been predicted that the reliability will become equal to or lower than a given threshold value.

Specifically, the image generation section 120 changes the display state of an object displayed displayed on the display section 190 corresponding to a given part (e.g., hand or foot) of the operator based on the reliability of the information about the bone (bone/joint of the hand or foot) corresponding to the given part. The object displayed corresponding to the given part is an object that moves or make a motion based on the motion of the given part, and may be a two-dimensional object or a three-dimensional object.

The image generation section 120 performs at least one of a process that blurs the object corresponding to the given part (blur filter process), a process that displays the object corresponding to the given part almost transparently (process that changes the α-value), and a process that changes the color of the object corresponding to the given part (process that changes the color of the object to a color close to the target color), as the reliability of the information about the bone corresponding to the given part decreases. Alternatively, the image generation section 120 may perform at least one of a process that changes the brightness (luminance) of the object corresponding to the given part, a process that changes the display state (width or depth) of the contour of the object corresponding to the given part, a process that changes the size of the object corresponding to the given part, and a process that changes an effect applied to the object corresponding to the given part, as the reliability of the information about the bone corresponding to the given part decreases.

2. Method

The method according to one embodiment of the invention is described in detail below.

2.1 Movement Limiting Boundary

A game device or a visual instrument (e.g., television set or record/play instrument) is normally configured so that the operator (user) performs an instruction operation using a button or a lever of a controller (remote controller). A game device or the like may be configured so that a controller includes a motion sensor (six-axis sensor), and the operator performs an instruction operation by moving the controller.

However, a game device or the like that utilizes such an operation interface requires a controller for performing an operation, and cannot implement an operation that directly reflects a gesture (e.g., hand (arm) movement) made by the operator.

In order to deal with this problem, one embodiment of the invention employs an operation interface that detects an operation input performed by the operator based on image information captured by an image sensor.

Figure 2A:
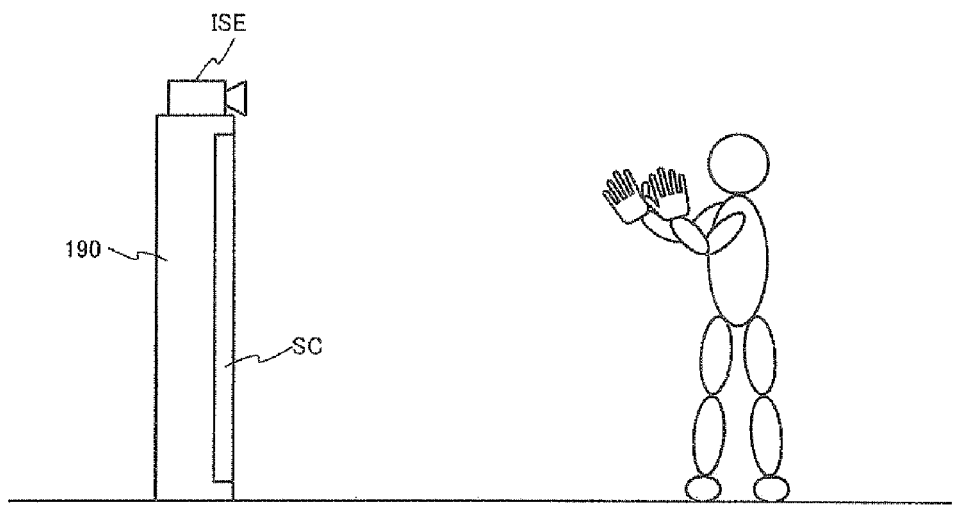
FIGS. 2A and 2B are views illustrative of an operation interface according to one embodiment of the invention that utilizes imaging information from an image sensor.

In FIG. 2A, an image sensor ISE that is implemented by a depth sensor (e.g., infrared sensor) and a color image sensor (RGB sensor (e.g., CCD or CMOS sensor)) is installed at a position corresponding to the display section 190 (screen SC). The image sensor ISE is installed so that its imaging direction (optical axis direction) coincides with the direction from the display section 190 to the operator, for example. The image sensor ISE acquires (captures) color image information and depth information about the operator viewed from the display section 190. The image sensor ISE may be provided in the display section 190, or may be provided as an external element (component). The installation position of the image sensor ISE is not limited to the position shown in FIG. 2A. The image sensor ISE may be installed at an arbitrary position (e.g., lower area of the display section 190).

Color image information and depth information shown in FIG. 213 are acquired using the image sensor ISE shown in FIG. 2A. For example, the color image information includes color information about the operator and his surroundings. The depth information includes the depth values of the operator and his surroundings as grayscale values, for example. The color image information may be image information in which the color value (RGB) is set to each pixel position, and the depth information may be image information in which the depth value is set to each pixel position, for example. Note that the image sensor ISE may be a sensor in which the depth sensor and the color image sensor are separately provided, or may be a sensor in which the depth sensor and the color image sensor are integrated.

The depth information may be acquired by a known method. For example, the depth information is acquired by emitting light (e.g., infrared radiation) from the image sensor ISE (depth sensor), and detecting the reflection intensity or the time of flight of the emitted light to detect the shape of the object (e.g., operator) viewed from the position of the image sensor ISE. The depth information is indicated by grayscale data (e.g., an object positioned near the image sensor ISE is bright, and an object positioned away from the image sensor ISE is dark).

Note that the depth information may be acquired in various ways. For example, the depth information (i.e., information about the distance from the object) may be acquired simultaneously with the color image information using a CMOS sensor or the like. The depth information may also be acquired using a distance sensor (ranging sensor) or the like that utilizes ultrasonic waves, for example.

In one embodiment of the invention, motion information about the operator (player or user) viewed from the image sensor ISE is acquired based on the image information from the image sensor ISE. An object displayed on the screen is controlled based on the acquired motion information. The motion information includes optical flow information, information that indicates the motion of the operator, skeleton information about the operator, and the like.

Figure 2B:
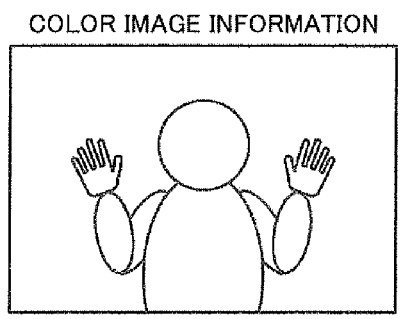
Figure 2B:
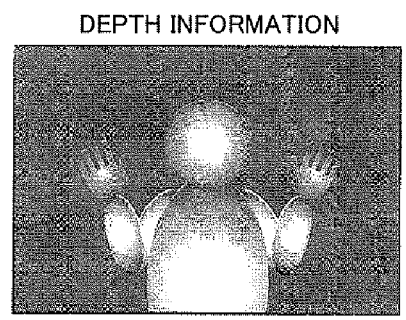
Figure 3:
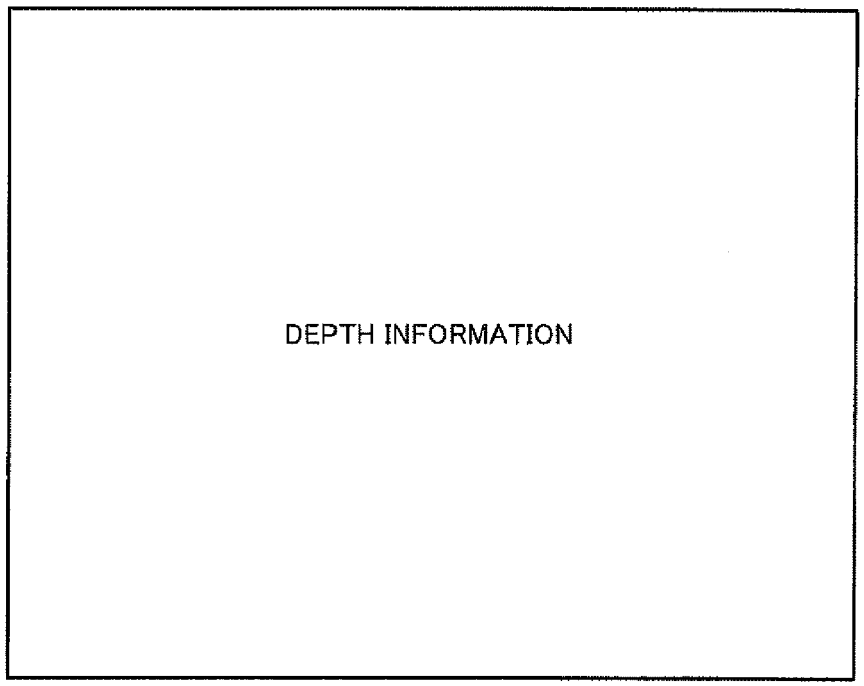
Figure 3:
Figure 3:
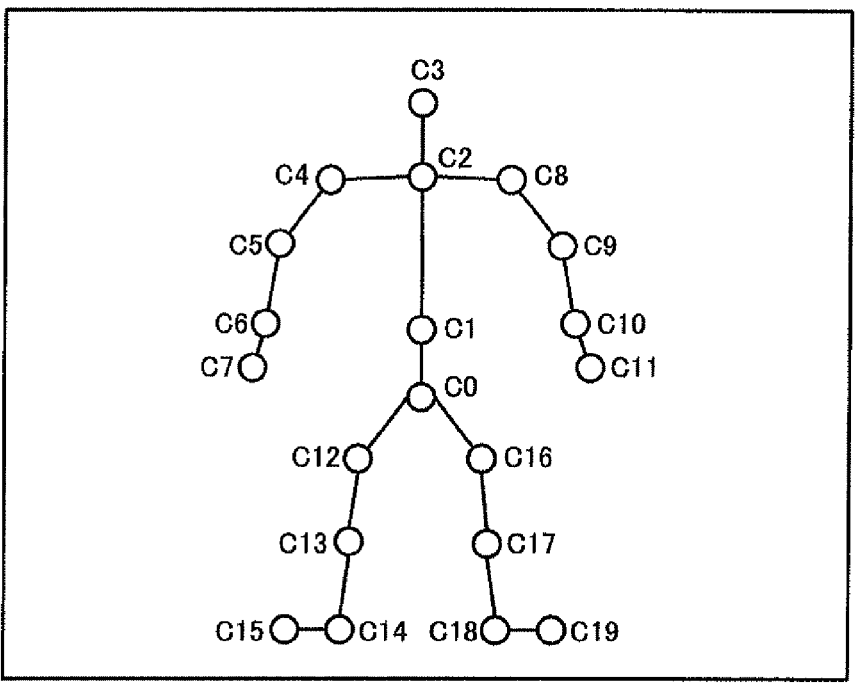

As shown in FIG. 3, skeleton information (motion information in a broad sense) used to specify the motion of the operator is acquired based on the depth information shown in FIG. 2B, for example. In FIG. 3, position information (three-dimensional coordinates) about bones of a skeleton has been acquired as position information about joints C0 to C19. The bones of the skeleton correspond to the parts (e.g., hand, foot, and chest) of the operator captured by the image sensor ISE, and the joints C0 to C19 correspond to the joints of the operator captured by the image sensor ISE.

For example, the three-dimensional shape of the operator or the like viewed from the image sensor ISE can be acquired using the depth information shown in FIG. 2B. The area of each part (e.g., face) of the operator can be specified by face image recognition or the like when using the color image information in combination with the depth information. Therefore, each part of the operator and the joint position of each part are estimated based on the three-dimensional shape information, the motion vector (optical flow) of the image, and the like. The three-dimensional coordinate information about the joint position of the skeleton is calculated based on the two-dimensional coordinates of the pixel position of the depth information corresponding to the estimated joint position, and the depth information set to the pixel position to acquire the skeleton information shown in FIG. 3. More specifically, a plurality of models that differ in body shape and physique are provided. A matching process is performed on the body shape/physique of the operator and the body shape/physique of the plurality of models using the depth information and the color image information about the operator obtained using the image sensor ISE to specify a model having a body shape/physique similar to that of the operator. The joint position (i.e., the position of the bone/part) of the operator is estimated using the information about the joint position of the specified model or the like to acquire the skeleton information.

The motion of the operator can be specified in real time by utilizing the skeleton information, so that a novel operation interface environment can be implemented. Moreover, the skeleton information has high compatibility with the motion data about the character disposed in the object space. Therefore, the character (avatar) corresponding to the operator can be caused to make a motion in the object space by utilizing the skeleton information as the motion data about the character, for example.

In one embodiment of the invention, the object is moved in a movement area within the screen by utilizing the motion information (e.g., skeleton information).

Figure 4A:
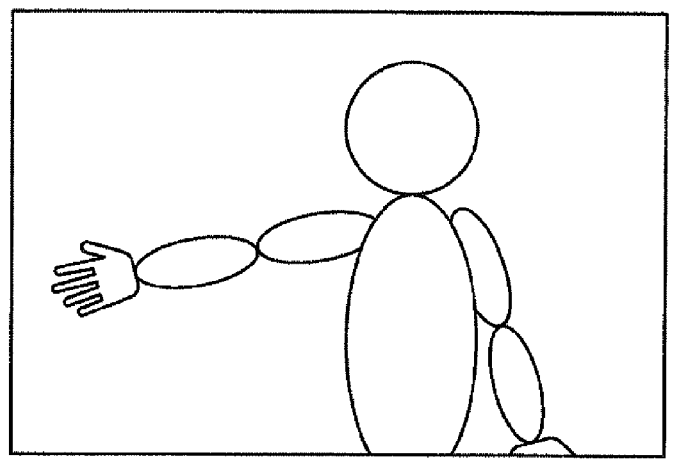
FIGS. 4A and 4B are views illustrative of a method that moves an object based on motion information about an operator.
Figure 4B:
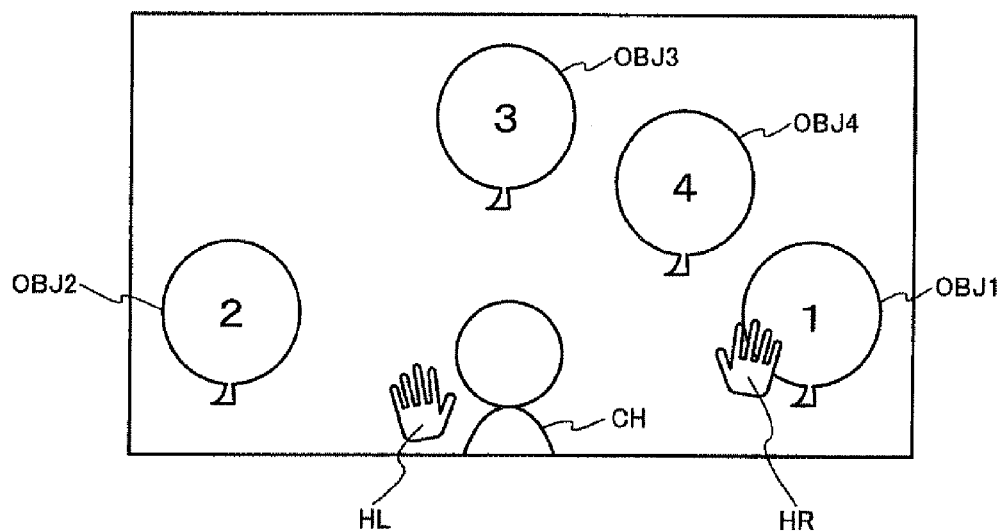
Figure 5A:
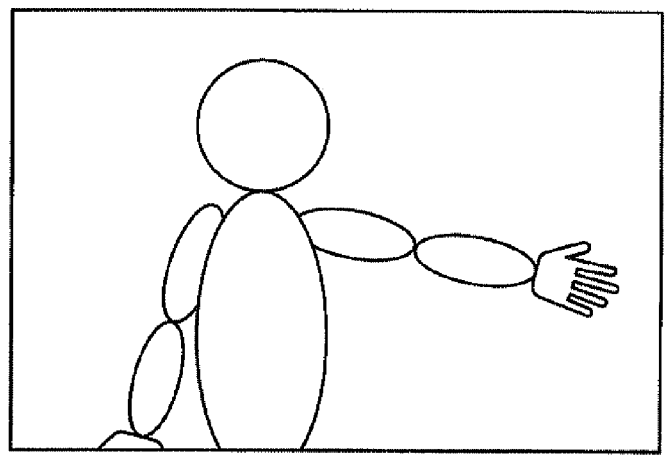
FIGS. 5A and 5B are views illustrative of a method that moves an object based on motion information about an operator.
Figure 5B:
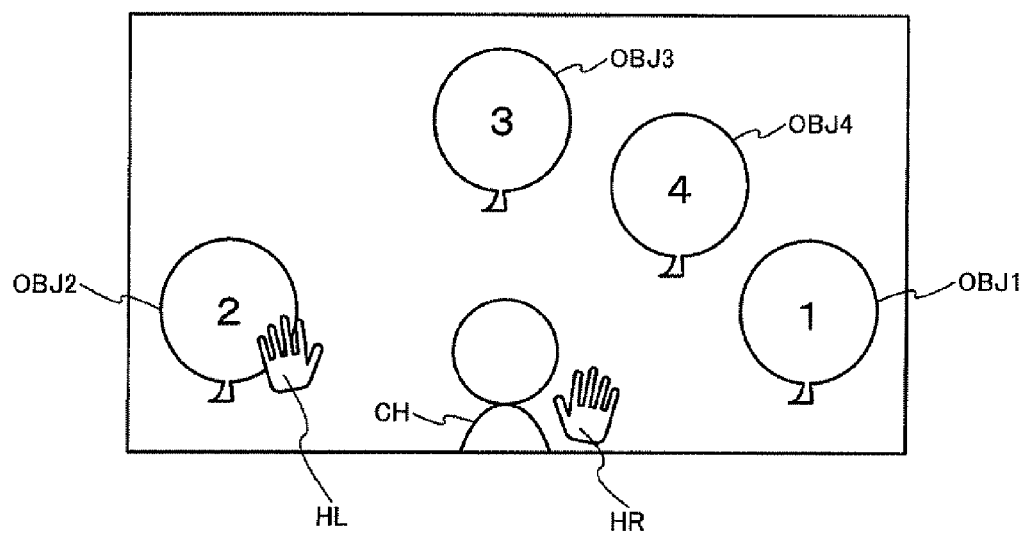

FIGS. 4A and 5A show examples of a captured image of the operator captured using the image sensor ISE, and FIGS. 4B and 5B show examples of an image (game image) displayed on the display section 190.

When the operator has moved the right hand (first part in a broad sense) as shown in FIG. 4A, a right hand object HR (first object in a broad sense) shown in FIG. 4B moves on the screen in the same manner as the right hand of the operator. For example, when the operator has moved the right hand around, the right hand object HR moves on the screen in the same manner as the right hand of the operator. The movement of the right hand object HR is controlled using the position information (joint position information) about the bone of the right hand included in the skeleton information about the operator. Specifically, the movement of the right hand object HR is controlled using the skeleton information by calculating the display position of the right hand object HR based on the position information about the bone of the right hand.

When the operator has moved the left hand (second part in a broad sense) as shown in FIG. 5A, a left hand object HL (second object in a broad sense) shown in FIG. 5B moves on the screen in the same manner as the right hand of the skeleton of the operator. For example, when the operator has moved the left hand around, the left hand object HL moves on the screen in the same manner as the left hand of the operator. The movement of the left hand object HL is controlled using the position information about the bone of the left hand included in the skeleton information about the operator. Specifically, the movement of the left hand object HL is controlled using the skeleton information by calculating the display position of the left hand object HL based on the position information about the bone of the left hand.

In FIGS. 4B and 5B, contact target objects OBJ1 to OBJ4 that imitate a balloon are displayed on the screen. A numeral is assigned to each of the contact target objects OBJ1 to OBJ4. The operator enjoys a mini-game in which the operator breaks the balloon by causing the hand object HR or HL to come in contact with each of the contact target objects OBJ1 to OBJ4 in numerical order.

In FIG. 4B, the operator causes the right hand object HR to come in contact with the contact target object OBJ1 to which a numeral "1" is assigned by moving the right hand. In FIG. 5B, the operator causes the left hand object HL to come in contact with the contact target object OBJ2 to which a numeral "2" is assigned by moving the left hand. When the operator has caused the right or left hand object to come in contact with each contact target object in numerical order, points are added to the score of the operator.

As shown in FIGS. 4A and 5A, the operator can arbitrarily move the left hand or the right hand in the actual three-dimensional space. Therefore, when the operator has raised the right hand to a large extent (see FIG. 6A), the right hand object HR moves to a position above the contact target object (see FIG. 6B).

Specifically, since the balloon object is not present in the actual three-dimensional space where the operator is present, the operator intuitively raises or lowers the right hand or the left hand while observing the image (screen) displayed on the display section 190. Therefore, even if the operator has raised the right hand in order to cause the right hand object HR to come in contact with the object OBJ1, OBJ2, or the like, the right hand object HR may pass the object OBJ1, OBJ2, or the like, and may move to a position above the object OBJ1, OBJ2, or the like (see FIG. 6B).

In this case, the operator may feel uncomfortable or may be frustrated since the hand object HR or HL does not move in the desired way, so that it may be difficult to implement a smooth game process.

Figure 7A:
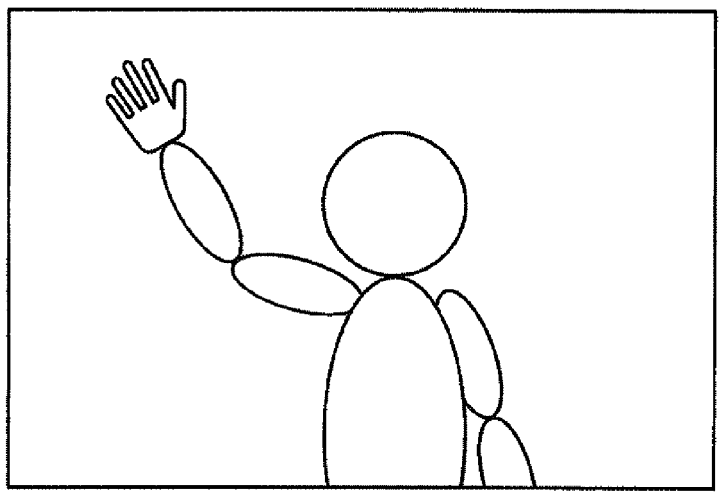
FIGS. 7A and 7B are views illustrative of an object control method according to one embodiment of the invention.
Figure 7B:
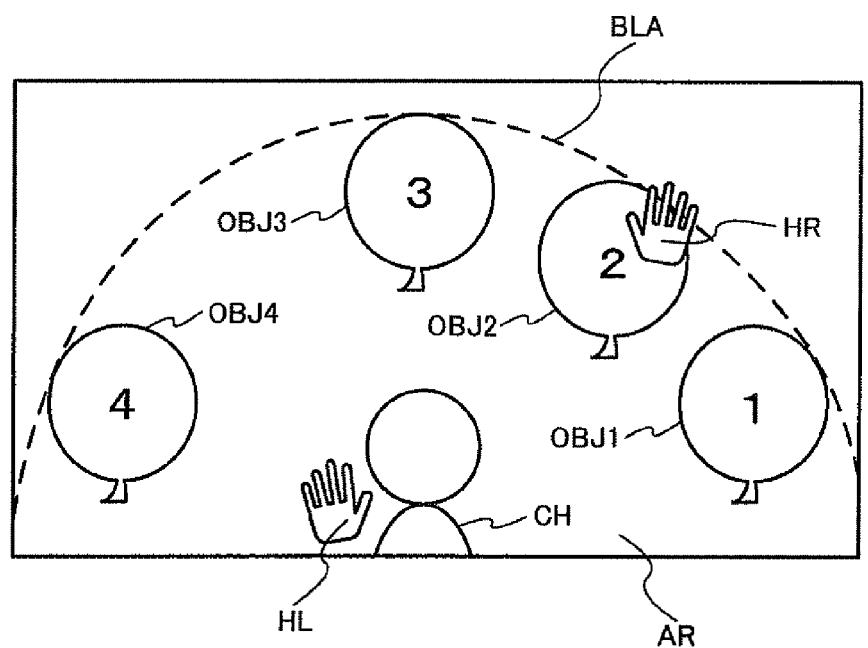

In one embodiment of the invention, as shown in FIG. 7B, a movement limiting boundary BLA (movement limiting boundary line or movement limiting boundary plane) is set in a movement area AR (screen area) of the hand objects HR and HL (objects in a broad sense) that are operated by the operator. In FIG. 7B, the movement limiting boundary BLA is set corresponding to a plurality of contact target objects OBJ1 to OBJ4 that are the contact targets of the hand objects HR and HL. Specifically, the contact target objects OBJ1 to OBJ4 are disposed in the same area as the hand objects HR and HL with respect to the movement limiting boundary BLA (i.e., disposed on the inner circumferential side of the movement limiting boundary BLA). In this case, the movement limiting boundary BLA is set to be circumscribed to the contact target objects OBJ1 to OBJ4. Specifically, the movement limiting boundary BLA is set to come in contact with the outer circumference of the contact target objects OBJ1 to OBJ4.

In one embodiment of the invention, the movement of the hand objects HR and HL is limited so that the hand objects HR and HL do not move beyond the movement limiting boundary BLA. Specifically, even when it is determined that the right hand object HR has moved beyond the movement limiting boundary BLA (see FIG. 7A) based on the skeleton information (i.e., the position information about the bone of the right hand) about the operator (see FIG. 7A), the movement of the right hand object HR is limited so that the right hand object HR does not move beyond the movement limiting boundary BLA (see FIG. 7B).

Figure 8A:
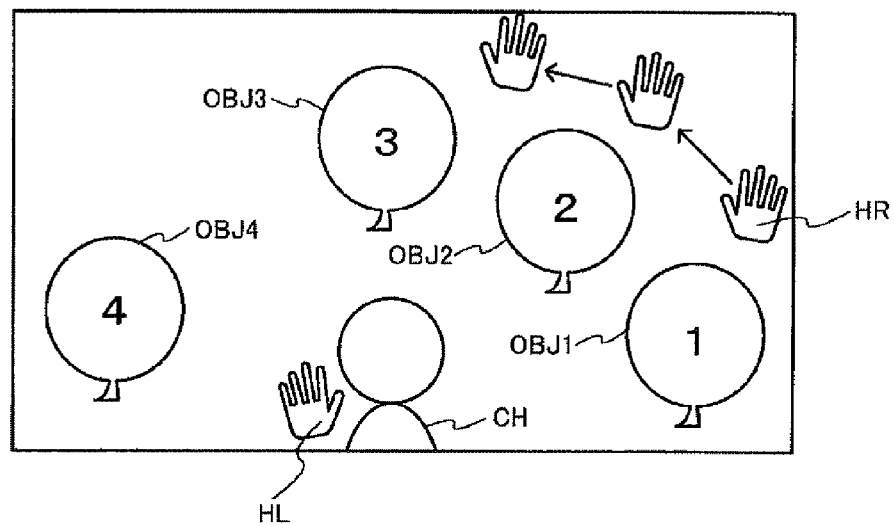
FIGS. 8A and 8B are views illustrative of an object control method according to one embodiment of the invention based on comparison with a comparative example.

For example, when the above method is not used, the right hand object HR may move along a path shown in FIG. 8A when the operator has moved the right hand in order to cause the right hand object HR to come in contact with the balloon objects OBJ1, OBJ2, and OBJ3 in numerical order. Specifically, although the operator desires to cause the right hand object HR to come in contact with the objects OBJ1, OBJ2, and OBJ3, the right hand object HR moves along a moving path away from the outer circumference of the balloon objects OBJ1, OBJ2, and OBJ3, so that the operator cannot make a score.

Figure 8B:
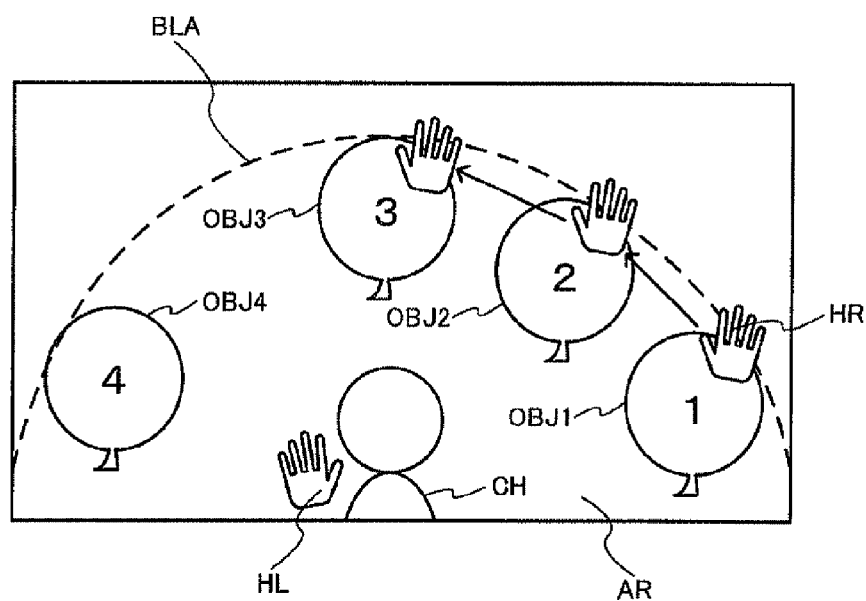

According to one embodiment of the invention, since the movement limiting boundary BLA shown in FIG. 8B is set, the right hand object HR moves along the movement limiting boundary BLA, or moves along a moving path on the inner circumferential side of the movement limiting boundary BLA. Therefore, the right hand object HR comes in contact with the balloon objects OBJ1, OBJ2, and OBJ3, so that the operator can easily make a score. This makes it possible to suppress a situation in which the operator feels uncomfortable as compared with the comparative example shown in FIG. 8A, so that a smooth game process can be implemented.

Figure 9:
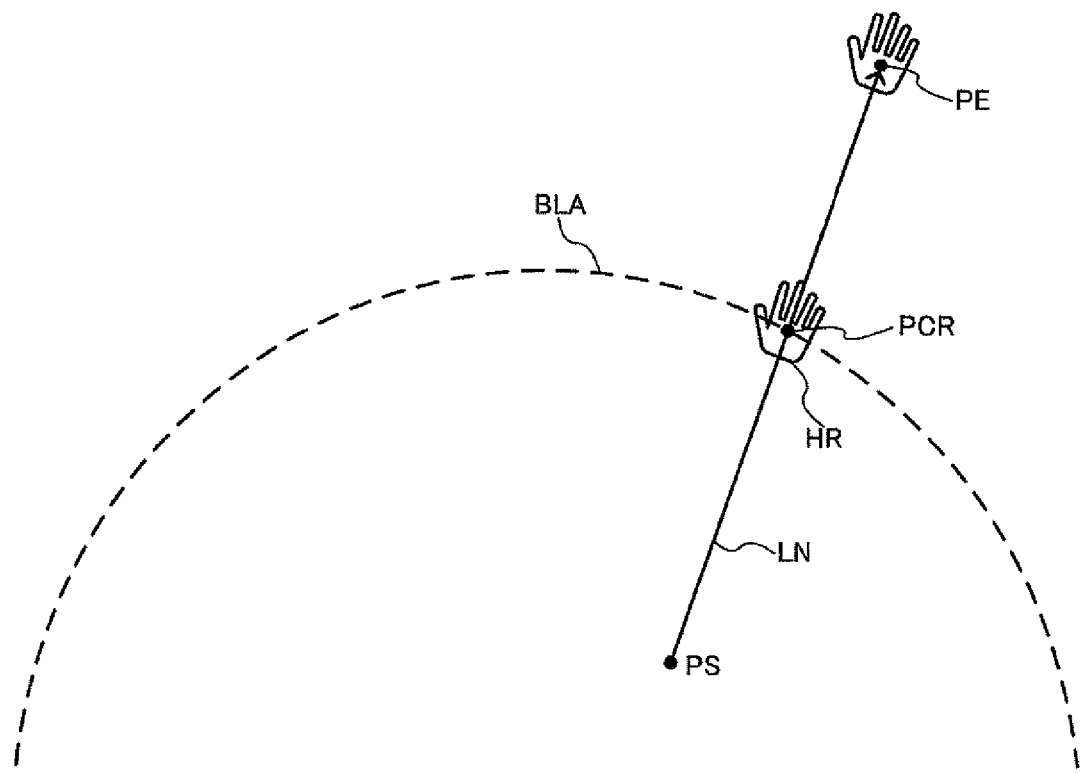
FIG. 9 is a view illustrative of a method that controls an object so that the object does not move beyond a movement limiting boundary.

FIG. 9 shows a specific example of the method that limits the movement of the right hand object HR. For example, a position PS indicates the movement start position of the right hand object HR, and a position PE indicates the position reached by the right hand object HR that is calculated based on the position information about the bone of the right hand included in the skeleton information. When moving the right hand object HR using the skeleton information, the right hand object HR moves to the position PE.

According to one embodiment of the invention, since the movement limiting boundary BLA is set, the right hand object HR does not move to the position PE, but moves to an intersection position PCR of a line segment LN that connects the positions PS and PE and the movement limiting boundary BLA. This makes it possible to limit the movement of the right hand object HR so that the right hand object HR doe not move beyond the movement limiting boundary BLA independently of the skeleton information.

Note that the object movement limiting method according to one embodiment of the invention is not limited to the method described above with reference to FIG. 9 and the like. Various modifications may be made. For example, the right hand object HR may be allowed to move beyond the movement limiting boundary BLA to some extent due to inertia or the like, instead of causing the right hand object HR to stop at the position PCR along the movement limiting boundary BLA as shown in FIG. 9.

According to the above method, a situation in which the object moves to an unintended position can be prevented by providing the movement limiting boundary. This makes it possible to implement an appropriate movement control of the object that moves based on the motion information about the operator.

In particular, the moving range of the object can be set to a wide range by performing a correction process (described later) on the position information about the bone, so that the object can be moved all over the screen, for example. When performing the correction process so that the object can move over a wide moving range, the problems described with reference to FIGS. 6A and 6B or FIG. 8A may occur.

Figure 6A:
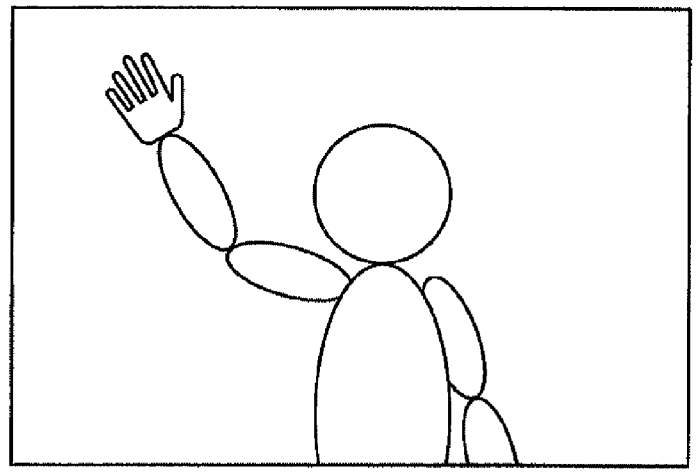
FIGS. 6A and 6B are views illustrative of problems caused by a comparative example.
Figure 6B:
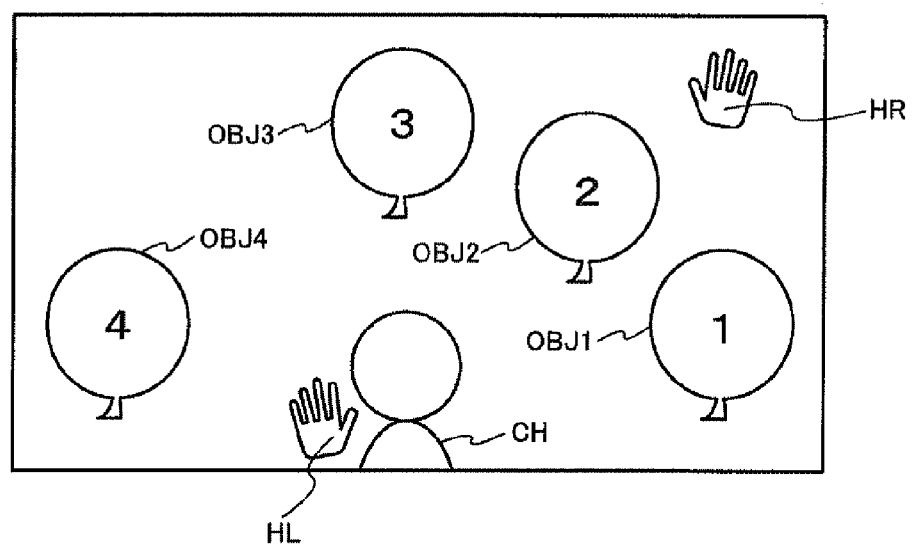

The method according to one embodiment of the invention can solve the problems described with reference to FIGS. 6A and 6B or FIG. 8A by providing the movement limiting boundary, even if the object moves over a wide moving range (e.g., all over the screen). This makes it possible to increase the moving range of the object while preventing a problem caused by an increase in moving range of the object.

2.2 Setting of a Plurality of Movement Areas

An example of setting a plurality of movement areas and moving the object in such a plurality of movement areas is described below.

Figure 10A:
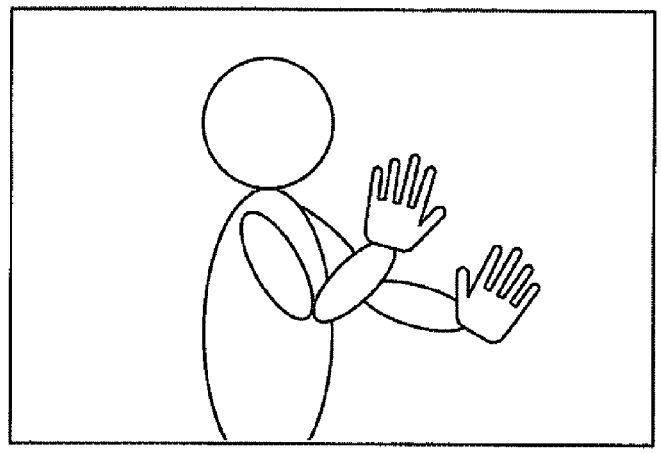
FIGS. 10A and 10B are views illustrative of a method that moves objects in a first movement area and a second movement area.
Figure 10B:
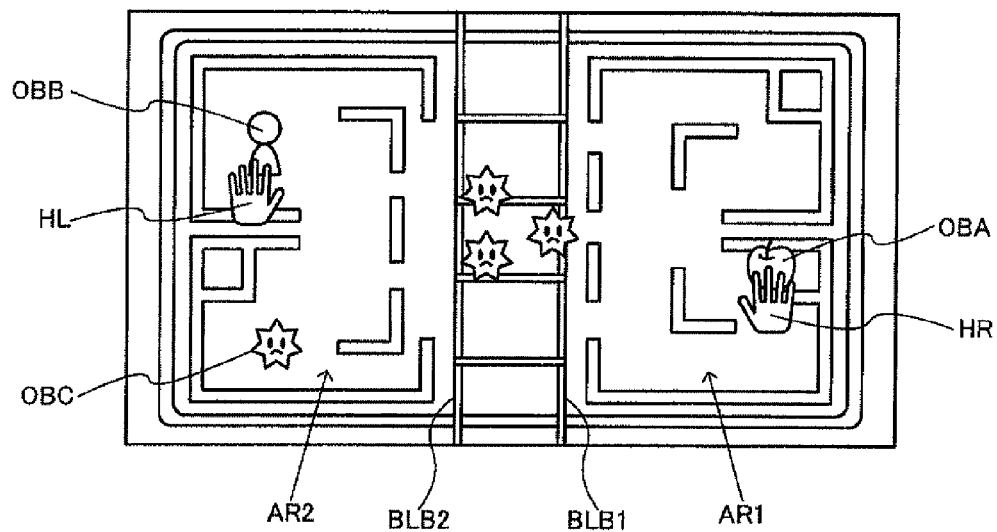

In a game shown in FIGS. 10A and 10B, when the operator has moved the right hand as shown in FIG. 10A, the right hand object HR (first object in a broad sense) moves in a first movement area AR1 on the game screen shown in FIG. 10B in the same manner as the right hand of the operator. When the operator has moved the left hand, the left hand object HL (second object in a broad sense) moves in a second movement area AR2 in the same manner as the left hand of the operator.

The operator causes the right hand object HR to move in the first movement area AR1 by moving the right hand so that the right hand object HR always comes in contact with an object OBA that imitates a fruit. The operator causes the left hand object HL to move in the second movement area AR2 by moving the left hand so that the left hand object HL comes in contact with a character object OBB, and moves the object OBB so that the object OBB is not caught by an enemy character object OBC.

In FIG. 10B, the right hand object HR (first object) is moved in the first movement area AR1 based on the motion information (skeleton information) about the right hand (first part in a broad sense) of the operator. The left hand object HL is moved in the second movement area AR2 based on the motion information about the left hand (second part in a broad sense) of the operator.

Movement limiting boundaries BLB1 and BLB2 are set between the movement area AR1 and the movement area AR2 so that the right hand object HR does not move beyond the movement limiting boundary BLB1, and the left hand object HL does not move beyond the movement limiting boundary BLB2.

Specifically, the right hand object HR moves only in the movement area AR1. For example, even if the operator has moved the right hand in the leftward direction in FIG. 10A, the right hand object HR does not enter the movement area AR2 across the movement limiting boundary BLB1. The left hand object HL moves only in the movement area AR2. For example, even if the operator has moved the left hand in the rightward direction in FIG. 10A, the left hand object HL does not enter the movement area AR1 across the movement limiting boundary BLB2.

The operator enjoys the game shown in FIGS. 10A and 10B by moving the right hand object HR in the movement area AR1, and moving the left hand object HL in the movement area AR2 (i.e., performing a game operation) by separately moving the right hand and the left hand. This makes it possible to move the objects by separately moving the right hand and the left hand, so that a novel game can be implemented.

In FIG. 10B, the movement limiting boundaries BLB1 and BLB2 are set between the movement areas AR1 and AR2. This makes it possible to prevent a situation in which the right hand object HR corresponding to the right hand of the operator moves to the left movement area AR2, or the left hand object HL corresponding to the left hand of the operator moves to the right movement area AR1. For example, when the operator has crossed the arms, the right hand object HR stops around the movement limiting boundary BLB1, and the left hand object HL stops around the movement limiting boundary BLB2. This makes it possible to prevent a situation in which the operator is confused, and implement a convenient and intuitive operation interface environment.

In FIG. 10B, a screen-edge movement limiting boundary is provided corresponding to the edge of the screen on which the game image is displayed. The movement of the hand objects HR and HL is limited so that the hand objects HR and HL do not move beyond the screen-edge movement limiting boundary.

Figure 11A:
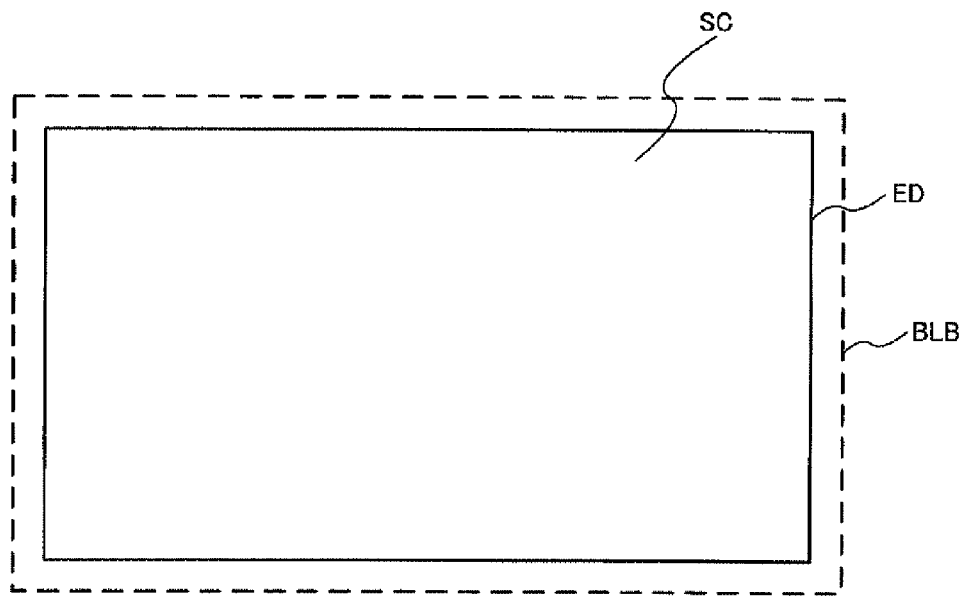
FIGS. 11A and 11B are views illustrative of a method that sets a screen-edge movement limiting boundary.

As shown in FIG. 11A, a screen-edge movement limiting boundary BLB is provided outside the edge ED of the screen SC. Specifically, the screen-edge movement limiting boundary BLB is set along the outer circumference of the screen SC. The operator can move the right hand object HR and the left hand object HL over a wide moving range as a result of setting the screen-edge movement limiting boundary BLB, so that a smooth and open operation interface environment can be provided.

Figure 11B:
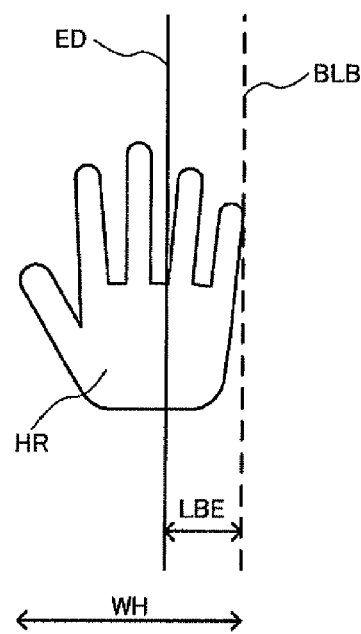

When setting the screen-edge movement limiting boundary BLB as shown in FIG. 11A, it is desirable that the relationship shown in FIG. 11B be satisfied. As shown in FIG. 11B, the distance between the screen-edge movement limiting boundary BLB and the edge ED of the screen SC is referred to as LBE. The width (i.e., the width of the short side) of the object is referred to as WH. In FIG. 11B, the relationship "WH>LBE" is satisfied. Specifically, the distance LBE is smaller than the width WH.

When the relationship "WH>LBE" is satisfied, at least part of the right hand object HR is displayed on the screen SC (see FIG. 11B) when the right hand object HR has moved to an area around the edge of the screen, for example. This makes it possible to prevent a situation in which the operator loses sight of the right hand object HR when the right hand object HR has moved to an area around the edge of the screen, so that a operation interface environment that it is more convenient to the operator can be provided.

2.3 Correction Process on Position Information about Bone of Skeleton

In one embodiment of the invention, a correction process is performed on the position information about the bone of the skeleton in order to increase the moving range of the object, or absorb the difference between individual operators.

For example, the body shape/physique of the operator differs depending on the height, age, and the like. When causing the object to move or make a motion on the screen according to the motion of the operator, it is desirable that the movement/motion range cover the entire screen.

In one embodiment of the invention, a correction process is performed on the position information (joint position information) about the bone indicated by the skeleton information (see FIG. 3), and an image is generated based on the result of the correction process.

Figure 12A:
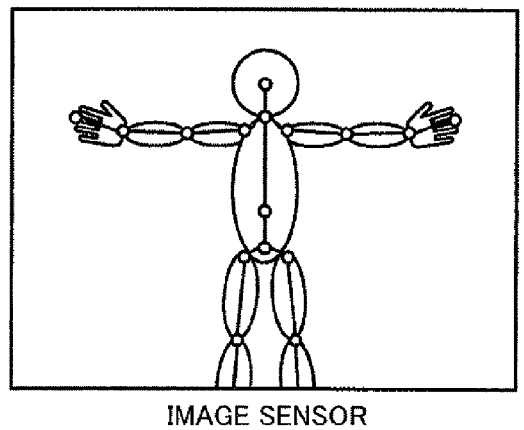
FIGS. 12A and 12B are views illustrative of a correction process on position information about a bone.

FIG. 12A shows an example of a captured image (image information (e.g., color image)) of an adult operator captured using the image sensor ISE. Skeleton information shown in FIG. 12A is acquired from the captured image.

Figure 12B:
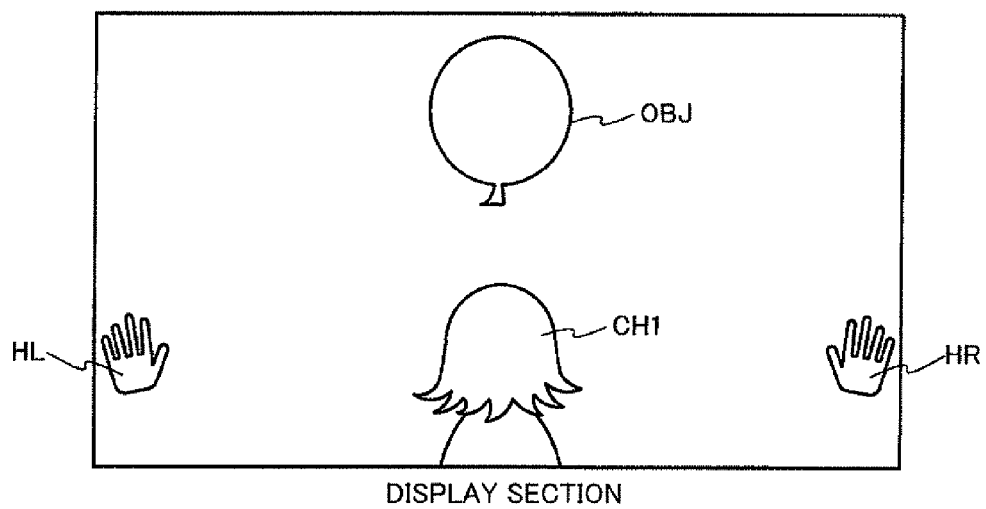

An image shown in FIG. 1213 is generated based on the motion of the skeleton of the operator shown in FIG. 12A, and displayed on the display section 190. Specifically, the right hand object HR and the left hand object HL shown in FIG. 12B move on the screen in the same manner as (based on the motion of) the right hand and the left hand of the skeleton of the operator shown in FIG. 12A. Note that CH1 indicates a character used as an avatar of the adult operator.

Figure 13A:
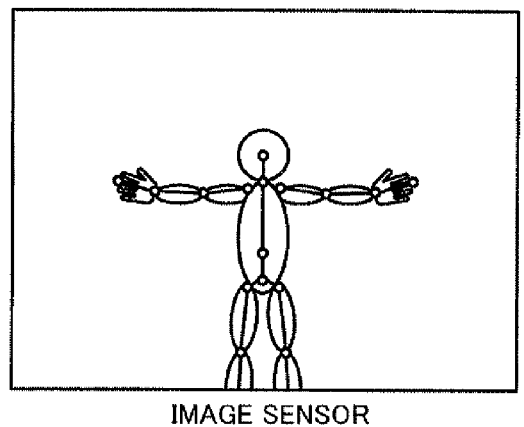
FIGS. 13A and 13B are views illustrative of a correction process on position information about a bone.

FIG. 13A shows an example of a captured image of a child operator captured using the image sensor ISE. Skeleton information shown in FIG. 13A is acquired from the captured image.

Figure 13B:
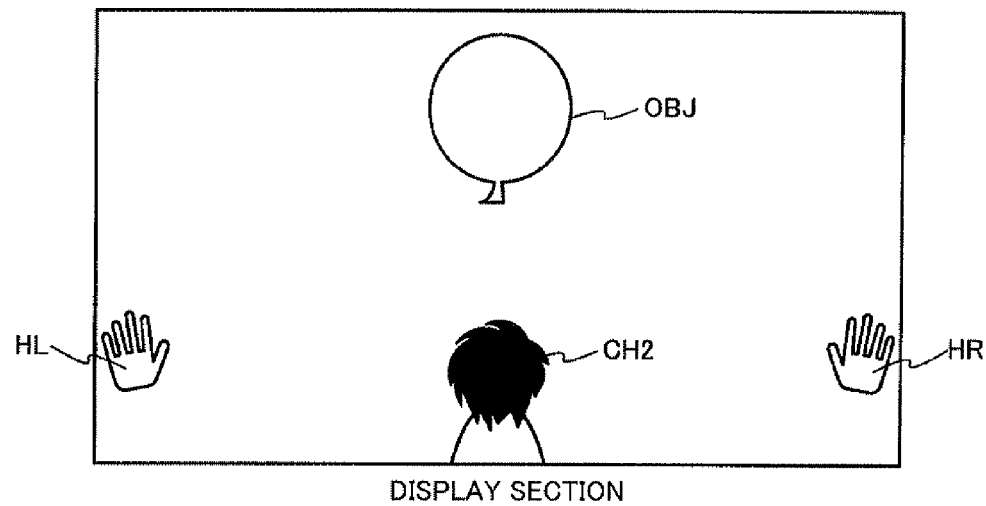

An image shown in FIG. 13B is generated based on the motion of the skeleton of the operator shown in FIG. 13A, and displayed on the display section 190. Specifically, the right hand object HR and the left hand object HL shown in FIG. 7B move on the screen in the same manner as (based on the motion of) the right hand and the left hand of the skeleton of the operator shown in FIG. 13A. Note that CH2 indicates a character used as an avatar of the child operator.

When acquiring the skeleton information about the operator, and moving the hand objects HR and HL on the screen in this manner, if the hand objects HR and HL are moved directly using the position information about the bone included in the skeleton information, a difference in moving range of the hand objects HR and HL occurs between a case where the operator is an adult and a case where the operator is a child.

For example, when the operator is an adult (see FIG. 12A), the hand objects HR and HL move over a wide range. On the other hand, when the operator is a child (see FIG. 13A), the hand objects HR and HL move within a narrow range. For example, when the moving range of the hand objects HR and HL is narrow, it is difficult to cause the hand objects HR and HL to come in contact with the contact target object OBJ. For example, when the object OBJ is disposed in an area around the edge of the screen, it may be impossible for the child operator to cause the hand objects HR and HL to come in contact with the object OBJ. Therefore, some operators may play the game advantageously depending on physique, age, and the like (i.e., the game may become unfair).

According to one embodiment of the invention, the correction process is performed on the position information about the bone, and the hand objects HR and HL are then moved, instead of causing the hand objects HR and HL to move or make a motion directly using the position information about the bone included in the skeleton information. Specifically, the movement or the like of the object is controlled based on the result of the correction process. Therefore, the hand objects HR and HL move to the edge of the screen (see FIGS. 12B and 13B) not only when the adult operator has spread the arms (see FIG. 13B), but also when the child operator has spread the arms (see FIG. 13A). Specifically, the correction process is performed so that the display positions of the objects HR and HL when the skeleton of the adult operator (first operator in a broad sense) has spread the arms (first state in a broad sense) are identical (almost identical) with the display positions of the objects HR and HL when the skeleton of the child operator (second operator in a broad sense) has spread the arms (first state in a broad sense).

This makes it possible for the operator to move the hand objects HR and HL almost over the entire area of the screen (moving range) irrespective of whether the operator is an adult or a child, for example. This makes it possible to prevent a situation in which some operators may play the game advantageously depending on physique, age, and the like (i.e., a fair game can be implemented).

An example of the correction process according to one embodiment of the invention is described below with reference to FIGS. 14A and 14B. Specifically, corrected position information is obtained by performing the correction process on the position information about the bone of the skeleton. The object is controlled based on the corrected position information to generate an image in which the object is displayed at a display position on the screen corresponding to the corrected position information.

Figure 14A:
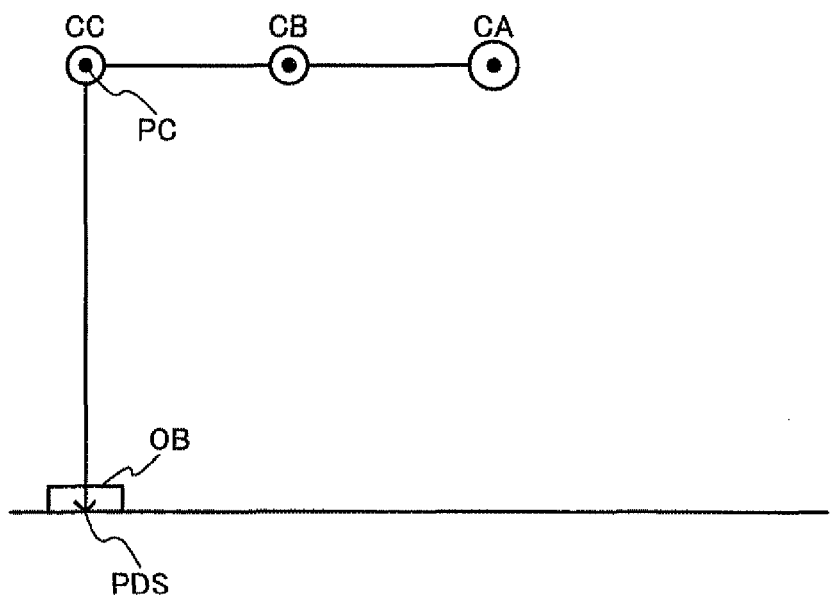
FIGS. 14A and 14B are views illustrative of a method that calculates a drawing position based on corrected position information.

FIG. 14A is a view illustrative of a case where the correction process is not performed. In FIG. 14A, CC indicates a joint (finger joint or wrist joint) of a hand, for example. When the correction process is not performed, a display position PDS on the screen is calculated based on a position PC of the joint CC. For example, the display position PDS is calculated by projecting the position CC onto the screen. An image is then generated so that the object OB is displayed at the display position PDS.

Figure 14B:
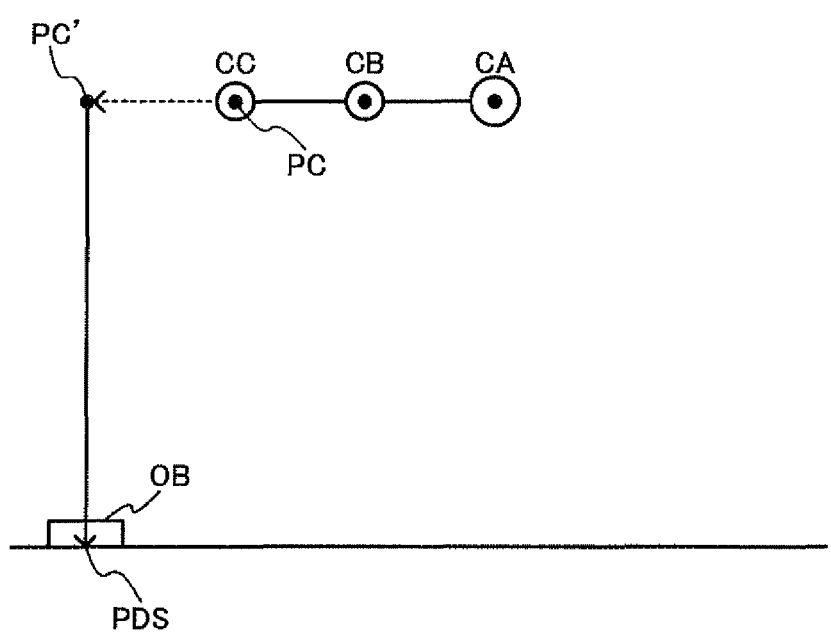

FIG. 14B is a view illustrative of a case where the correction process is performed. In FIG. 14B, a corrected position PC' is calculated by performing the correction process on the position PC (position of the bone of the hand) of the joint CC. For example, when the operator is a child (see FIG. 13A), it is considered that the length of the arm is shorter than that of a reference operator. Therefore, a position obtained by extending the position PC along the arm is calculated as the corrected position PC'. The display position PDS on the screen is calculated based on the corrected position PC', and an image is generated so that the object OB is displayed (disposed) at the display position PDS. Therefore, the hand objects HR and HL reach the edge of the screen (see FIG. 13B) when the child operator has fully spread the arms. On the other hand, when the operator is an adult with a good physique, it is considered that the length of the arm is greater than that of the reference operator. Therefore, a position obtained by moving the position PC along the arm toward the trunk is calculated as the corrected position PC'.

When performing the correction process based on comparison with the reference operator, the correction process may be performed using physique information about the operator. The physique information (body shape information or skeleton information) indicates the physique and the like of the operator. For example, the physique information includes information about the distance between the joints of the operator, information about the length of each part, and the like. The physique information may be calculated based on the skeleton information shown in FIG. 3, for example.

Specifically, the skeleton information shown in FIG. 3 includes the joint position information (i.e., position information about each bone of the skeleton of the operator) (described later). In this case, distance information about the distance between a first joint and a second joint of the skeleton may be used as the physique information, and the correction process shown in FIG. 14B and the like is performed using the distance information (i.e., physique information).

Figure 15A:
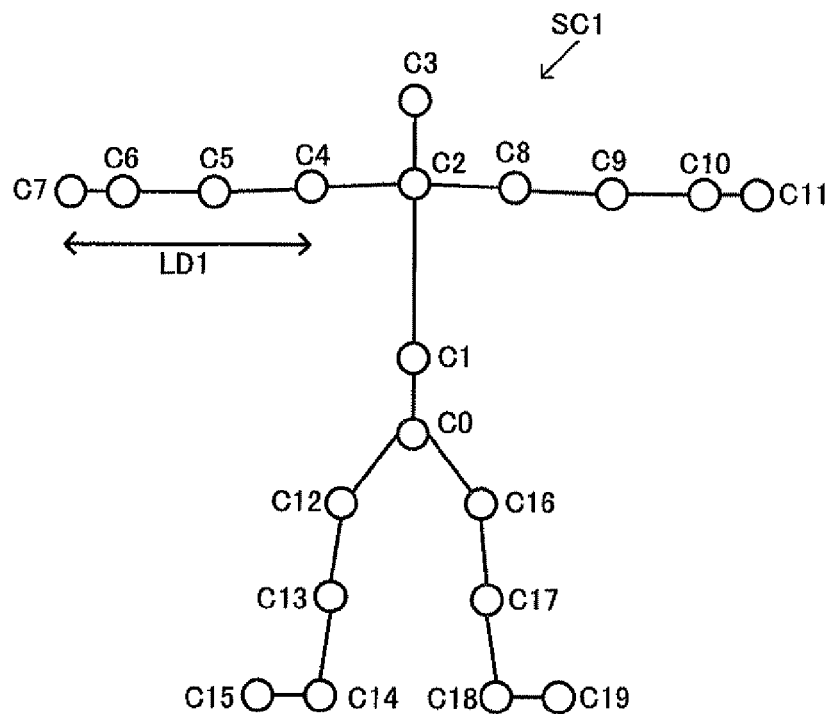
FIGS. 15A and 15B are views illustrative of a correction process based on physique information about an operator.
Figure 15B:
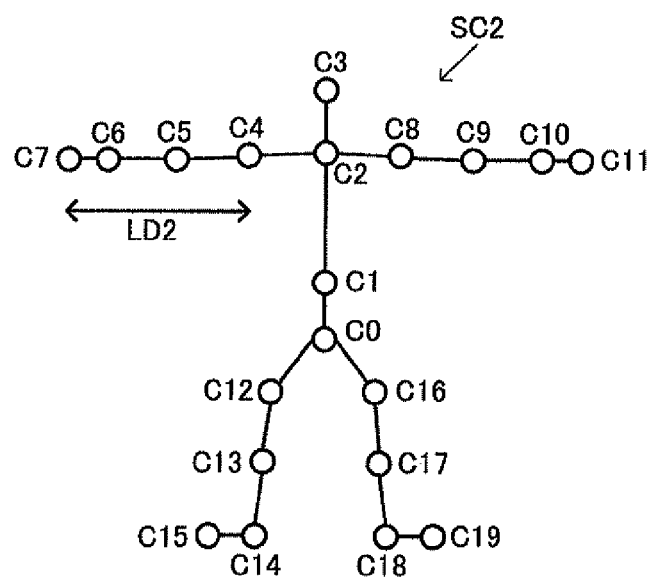

FIG. 15A shows skeleton information SC1 about a first operator with a good physique, and FIG. 15B shows skeleton information SC2 about a second operator with a small physique. In this case, a joint-to-joint distance LD1 between a shoulder joint C4 and a hand joint C7 (finger joint or wrist joint) is calculated from the skeleton information SC1 shown in FIG. 15A. A joint-to-joint distance LD2 between the shoulder joint C4 and the hand joint C7 is calculated from the skeleton information SC2 shown in FIG. 15B. The correction process shown in FIG. 14B and the like is performed using the joint-to-joint distances LD1 and LD2.

For example, when the skeleton information about the operator acquired using the image sensor is the skeleton information SC 1 (with a good physique) shown in FIG. 15A, the corrected position PC' shown in FIG. 14B is calculated based on information about the ratio of the joint-to-joint distance LD1 to a reference distance LDR, or the like. When the skeleton information about the operator is the skeleton information SC2 (with a small physique) shown in FIG. 15B, the corrected position PC' shown in FIG. 14B is calculated based on information about the ratio of the joint-to-joint distance LD2 to the reference distance LDR, or the like. This makes it possible to implement a correction process that absorbs the difference in physique information between the operators.

The distance information used as the physique information indicates the physique/body shape of the operator, and is not limited to the joint-to-joint distance shown in FIGS. 15A and 15B. Various modifications may be made. For example, the correction process may be performed using distance information obtained from the joint-to-joint distance of the left hand and the joint-to-joint distance of the right hand.

Alternatively, the correction process may be performed using distance information obtained from the joint-to-joint distances acquired over a plurality of frames. For example, the joint-to-joint distances acquired over a plurality of frames are averaged, and the correction process is performed using the resulting distance information. Specifically, when acquiring the skeleton information based on the image information from the image sensor, the joint-to-joint distance obtained from the skeleton information may vary (e.g., an irregular joint-to-joint distance may be obtained in a specific frame). When the correction process is performed using such an irregular joint-to-joint distance, the display position PDS of the object OB shown in FIG. 14B may change, so that the object OB may be displayed at an unintended position, or the image of the object OB may flicker.

When averaging the joint-to-joint distances acquired over a plurality of frames, the effect of an irregular joint-to-joint distance obtained in a specific frame is reduced. This makes it possible to prevent a situation in which the object OB is displayed at an unintended position, or the image of the object OB flickers due to a change in the display position PDS.

Figure 16A:
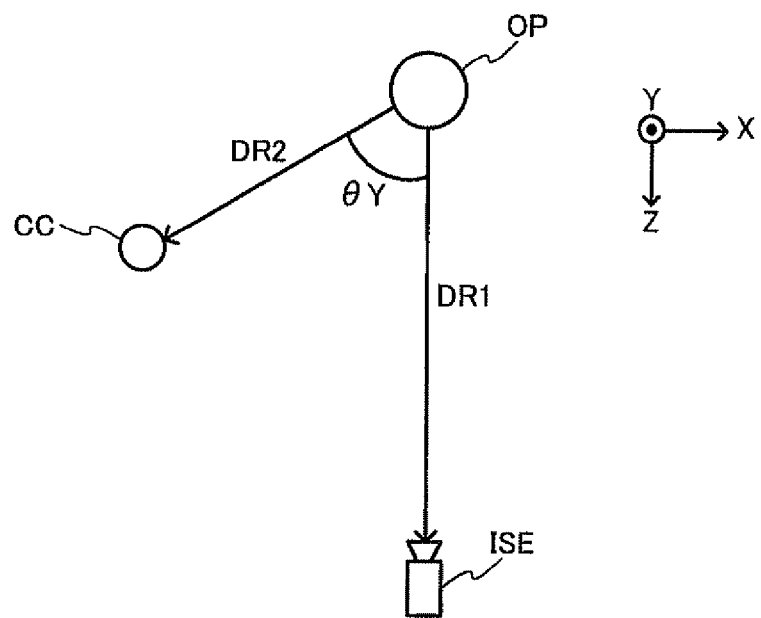
FIGS. 16A and 16B are views illustrative of a correction process using the angle formed by a first direction and a second direction.
Figure 16B:
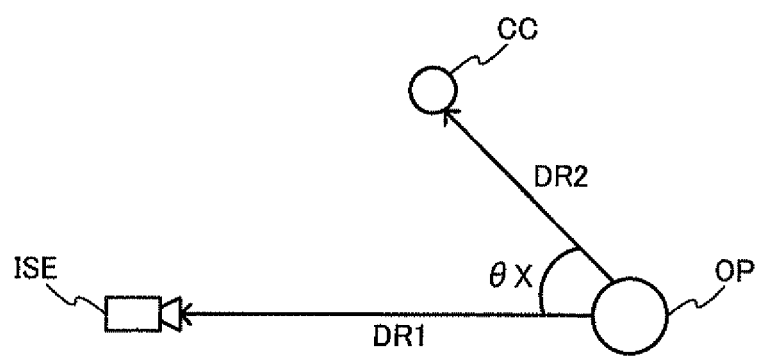

FIGS. 16A and 16B show another example of the correction process according to one embodiment of the invention. In the correction process shown in FIGS. 16A and 16B, angles θY and θX formed by a first direction DR1 that connects the position of an operator OP with the image sensor ISE and a second direction DR2 that connects the position (e.g., shoulder) of the operator OP with the position of a joint CC corresponding to a given part (e.g., hand) are determined, and the correction process is performed.

For example, the angle θY shown in FIG. 16A is an angle (rotation angle) around a Y-axis (coordinate axis) in the vertical direction, and the angle θX is an angle (rotation angle) around an X-axis (coordinate axis) in the horizontal direction (Y-direction). The X-coordinate of the display position of the object on the screen can be specified using the angle θY. The Y-coordinate of the display position of the object on the screen can be specified using the angle θX. For example, when the angle θY approaches 90° or −90°, the display position of the object approaches the left end or the right end of the screen. When the angle θY approaches 0°, the display position approaches the center of the screen. When the angle θX approaches 90° or −90°, the display position of the object approaches the upper end or the lower end of the screen. When the angle θX approaches 0°, the display position approaches the center of the screen.

According to the method shown in FIGS. 16A and 16B, since the angles θY and θX are determined, and the correction process is performed on the position information about the bone to determine the display position of the object, a correction process that automatically absorbs the difference in physique (e.g., length of the arm) between the operators can be implemented. It is possible to deal with a situation in which the operator has bent the arm by correcting the angles θY and θX using the joint-to-joint distance LD1 or LD2 (see FIGS. 15A and 15B), for example. When the operator has bent the arm so that the joint-to-joint distance LD1 or LD2 has decreased, the absolute values of the angles θY and θX are reduced, for example.

2.4 Reliability Information

Reliability information about the skeleton information, and an image generation method based on the reliability information are described below.

The motion of the operator can be specified in real time by utilizing the skeleton information shown in FIG. 3, so that a novel operation interface environment can be implemented.

However, the operator make various motions, and each operator has a different body shape/physique. Moreover, the operator may be positioned outside the imaging range of the image sensor ISE. Accordingly, it is difficult to acquire skeleton information with a reliability of 100%. In order to deal with this problem, when it is impossible to completely track each bone (part) of the skeleton of the operator, the position (joint position) of the bone is presumed, and reliability (i.e., reliability of presumption) is linked to the position of the bone obtained by presumption, for example.

FIG. 17A shows an example of the data structure of the skeleton information. The skeleton information shown in FIG. 17A includes position information linked to each bone (joint). The position information about each bone (joint) refers to three-dimensional coordinate information in the camera coordinate system of the image sensor ISE, for example. Each bone (joint) is linked to each part of the operator. For example, bones C0, C1, and C2 are linked to the waist, the chest, and the neck, respectively. Each bone (joint) may be linked to each part using the bone number (joint number) or the like.

FIG. 17B shows an example of the data structure of the reliability information. As shown in FIG. 17B, the reliability information includes reliability that is linked to each bone (joint) of the skeleton indicated by the skeleton information. The reliability indicates the reliability of information about each bone. Specifically, the skeleton information includes the position information about each bone linked to each part of the operator (see FIG. 17A), and the reliability information shown in FIG. 17B includes the reliability of the relationship between each part and each bone (joint) of the operator, the reliability of the position information about each bone (joint) of the operator, and the like. Note that the terms "bone" and "joint" may be used interchangeably taking account of the relationship between the bones and the joints.

Figure 18A:
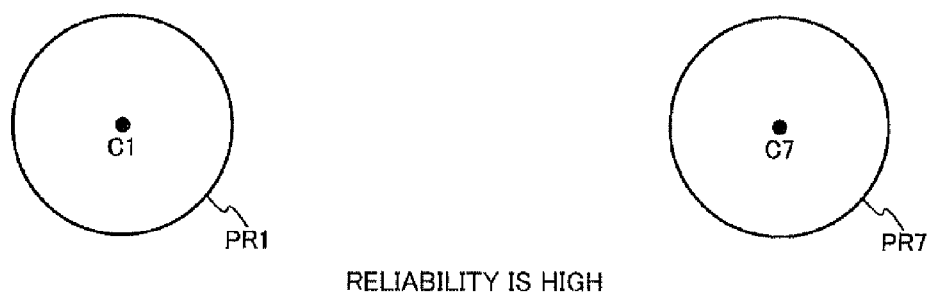
FIGS. 18A and 18B are views illustrative of reliability and an existence probability range.

In FIG. 18A, the joints C1 and C7 are positioned at a long distance. Note that PR1 and PR7 indicate existence probability ranges of the joints C1 and C7. For example, when the joints C1 and C7 are located at positions shown in FIG. 18A at one measurement timing, it is expected that the joints C1 and C7 are positioned within the existence probability ranges PR1 and PR7 at the next measurement timing. The above existence probability concept is used when presuming the skeleton information by the tracking the bone. When the joints C1 and C7 are positioned at a long distance as shown in FIG. 18A, the information (i.e., the relationship with the part and the position information) about the joints C1 and C7 has high reliability since the existence probability ranges PR1 and PR7 do not overlap.

Figure 18B:
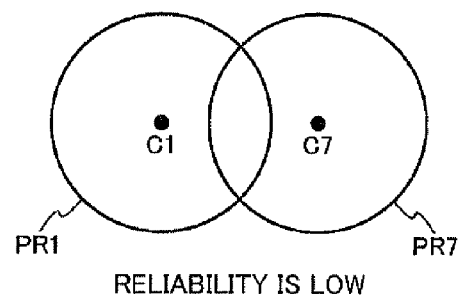

In FIG. 18B, the joints C1 and C7 are positioned at a short distance, and the existence probability ranges PR1 and PR7 overlap. In this case, the joint C1 may be determined to be joint C7 (or the joint C7 may be determined to be joint C7) at the next measurement timing. Therefore, erroneous determination may be made when presuming the skeleton information by the tracking the bone. Accordingly, the information (i.e., the relationship with the part and the position information) about the joints C1 and C7 has low reliability as compared with the case shown in FIG. 18A.

Figure 19A:
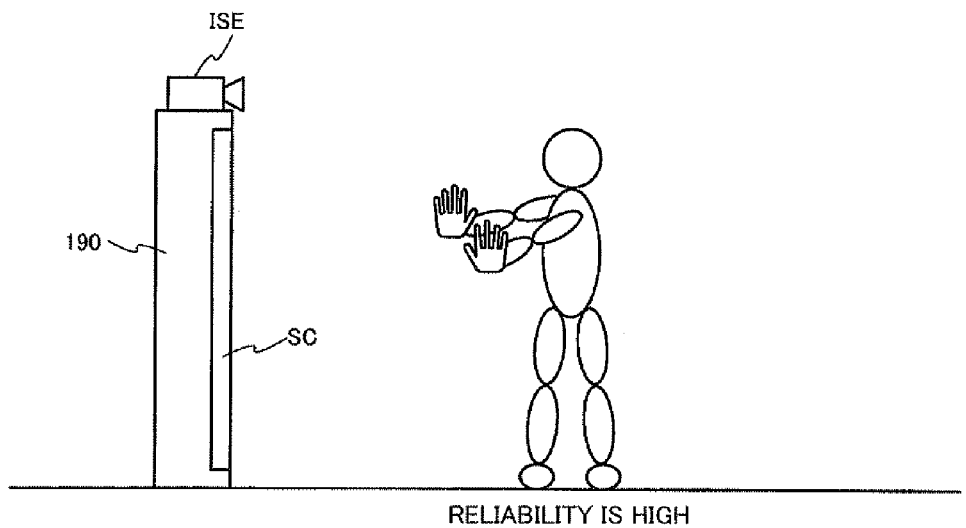
FIGS. 19A and 19B are views illustrative of reliability.

In FIG. 19A, the operator is positioned at an appropriate distance from the image sensor ISE. Therefore, the image information (e.g., resolution) obtained by the image sensor ISE has high reliability, and the skeleton information obtained based on the image information also has high reliability.

Figure 19B:
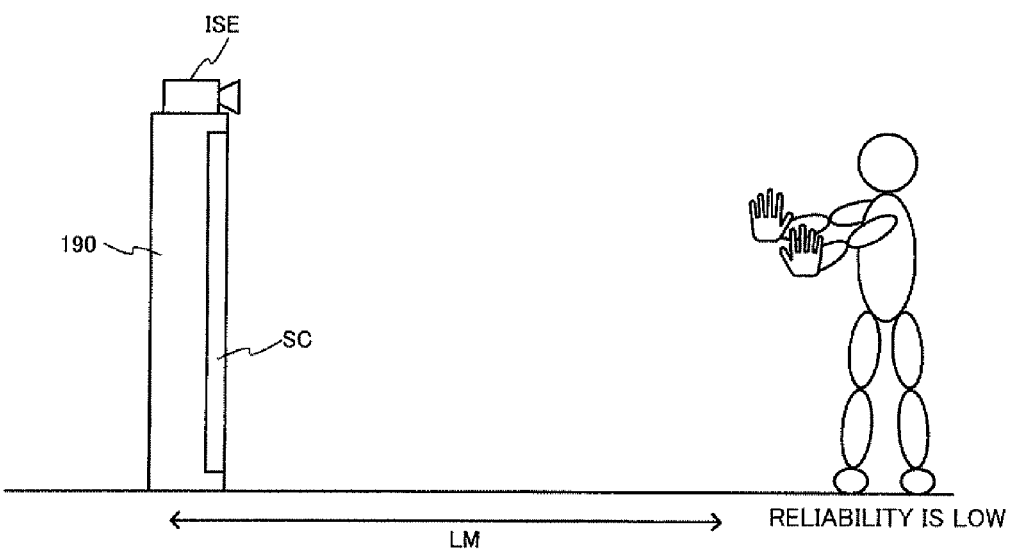

In FIG. 19B, the operator is positioned at a distance equal to or longer than a given distance (allowable distance) LM from the image sensor ISE. Therefore, the image information obtained by the image sensor ISE has low reliability, and the skeleton information obtained based on the image information also has low reliability.

As described above, the reliability information used in connection with one embodiment of the invention indicates lower reliability as a given part (e.g., hand or foot) of the operator approaches another part (e.g., chest, waist, head, or the other hand or foot) (see FIGS. 18A and 18B). The reliability information indicates low reliability when the operator is positioned at a distance equal to or longer than the given distance LM (e.g., 4 to 5 m) from the image sensor ISE (see FIGS. 19A and 19B). Note that the reliability information is not limited thereto. For example, the reliability information may be configured so that the recognition accuracy of the operator decreases when another person has approached recognition, so that the reliability of the skeleton information about the operator decreases.

In one embodiment of the invention, an image is generated using the above reliability information, and displayed on the display section 190. Specifically, the display state of the image displayed on the display section 190 is changed based on the reliability information, or the object control process or the game calculation process is performed based on the reliability information, and an image generated based on the result of the object control process or the game calculation process is displayed on the display section 190.

Figure 20A:
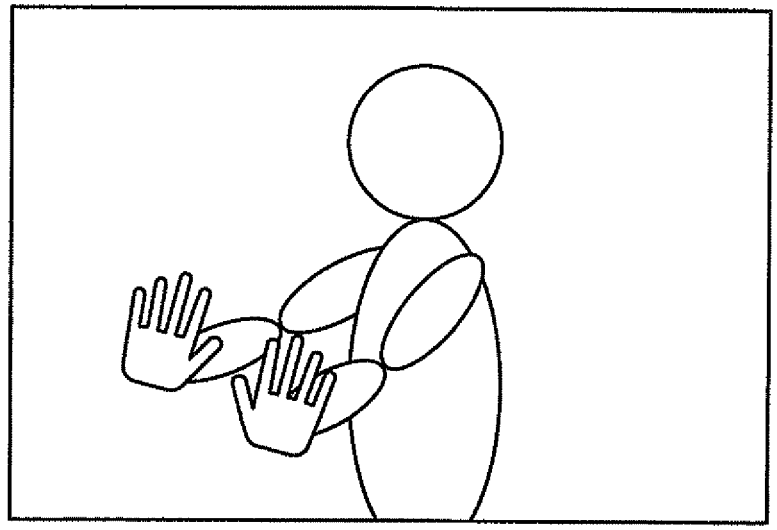
FIGS. 20A and 20B are views showing an operation motion made by an operator.
Figure 20B:
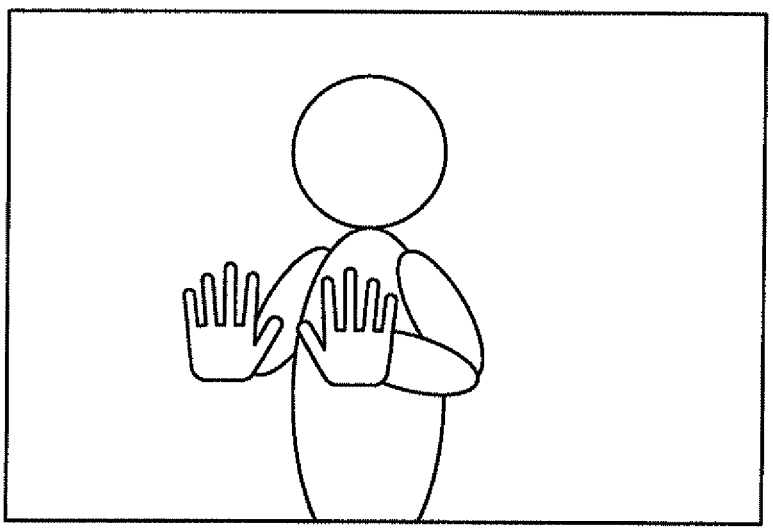

FIGS. 20A and 20B are views showing a state in which the operator stands in front of the display section 190 (see FIG. 2A), and inputs the operation information by making a body motion. In FIG. 20A, the operator inputs the operation information by moving the hands (arms) in a state in which the hands are positioned at a distance from the trunk. In FIG. 20B, the operator inputs the operation information by moving the hands (arms) in a state in which the hands are positioned close to the trunk.

In FIG. 20A, since the joint of the hand is positioned away from the joint of the chest (shoulder) as shown in FIG. 18A, the reliability of the information about the joint of the hand is high. Therefore, the position information about the hand or the like has high reliability. In FIG. 20B, since the joint of the hand is positioned close to the joint of the chest (shoulder), the reliability of the information about the joint of the hand is low. Therefore, the position information about the hand or the like has low reliability as compared with FIG. 20B. Specifically, the position information about the chest may be erroneously determined to be the position information about the hand.

When the operator has input the operation information in a state shown in FIG. 20B instead of a state shown in FIG. 20A, the system may erroneously recognize the operation of the operator. Specifically, the operation recognized by the system may not coincide with the intended operation of the operator.

Figure 21A:
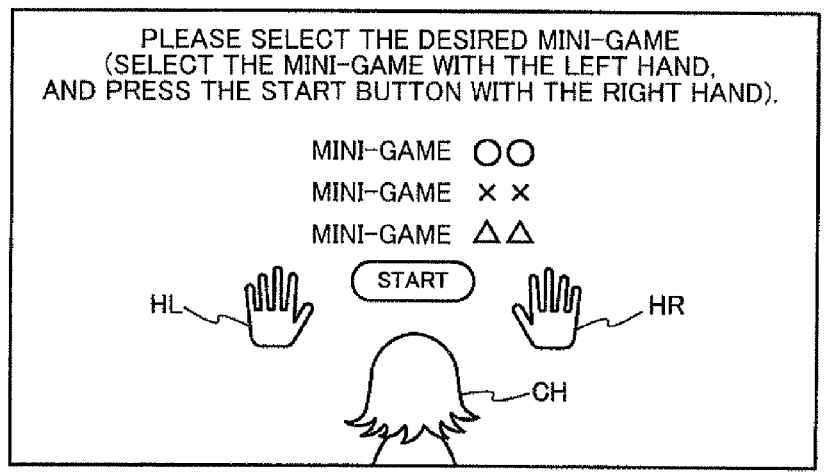
FIGS. 21A and 21B are views illustrative of a method that changes a display state of an image based on reliability information.
Figure 21B:
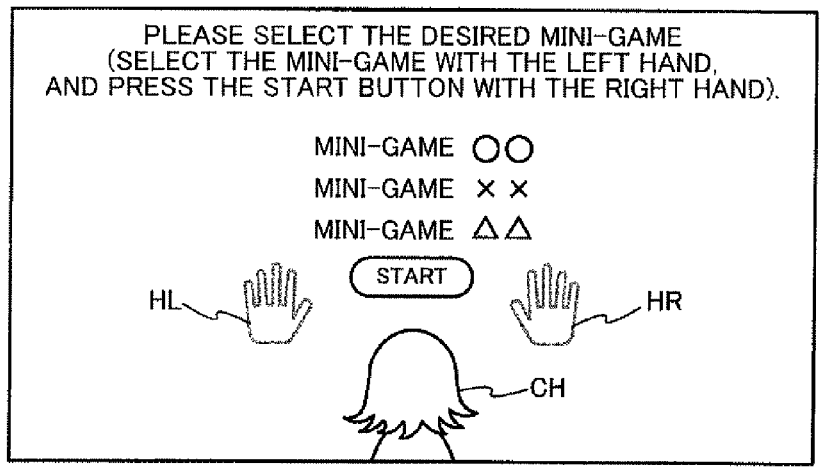

In one embodiment of the invention, the display state of an image is changed based on the reliability information as shown in FIGS. 21A and 21B in order to notify the operator that the operation state is not appropriate (see FIG. 20B).

In FIG. 21A, HR and HL indicate hand objects (icon or cursor) displayed on the display section 190 corresponding to the hands (given parts in a broad sense) of the operator. CH indicates an object of a character (avatar) corresponding to the operator.

When the operator has moved the hands like as shown in FIG. 20A, the hand objects HR and HL shown in FIG. 21A move (or make a motion) based on the movement of the hands of the operator. The operator selects a desired mini-game, or selects "START", by moving the hand objects HR and HL.

FIG. 21A shows an example of an image displayed when the hands are positioned away from the trunk (see FIG. 20A), and FIG. 21B shows an example of an image displayed when the hands are positioned close to the trunk (see FIG. 20B).

When the reliability of the skeleton information is considered to be high (see FIG. 20A), the hand objects HR and HL are clearly displayed (see FIG. 21A). When the reliability of the skeleton information is considered to be low (see FIG. 20B), the hand objects HR and HL are blurred, or displayed almost transparently (see FIG. 21A). Alternatively, the color of the hand objects HR and HL is changed to a pale color or the like.

Specifically, the hand objects HR and HL (objects in a broad sense) corresponding to the hands (given parts) are blurred, displayed almost transparently, or changed in color as the reliability of the information about the bone of the hand of the operator (i.e., the reliability of the information about the bone corresponding to a given part) decreases.

The hand objects HR and HL may be blurred by applying blur filtering or the like to the hand objects HR and HL. Specifically, the hand objects HR and HL may be blurred by utilizing a linear texture filtering method (i.e., a blur process using biliner filtering), box filter sampling (i.e., a multi-texture blur process that uses a plurality of textures at the same time), or the like. The hand objects HR and HL may be displayed almost transparently by changing the α-value of the hand objects HR and HL to an α-value that indicates an almost transparent state. The hand objects HR and HL may be changed in color by changing the color of the hand objects HR and HL to a color close to the target color.

Note that the display state of the hand objects HR and HL may be changed by another method. For example, the brightness (luminance) of the hand objects HR and HL may be changed, or the display state of the contour of the hand objects HR and HL may be changed, or the size of the hand objects HR and HL may be changed, or an effect applied to the hand object HR and HL may be changed as the reliability of the skeleton information decreases. For example, the brightness of the hand objects HR and HL may be decreased, or the depth or the width of the contour of the hand objects HR and HL may be decreased, or the size of the hand objects HR and HL may be increased or decreased as the reliability of the skeleton information decreases. Alternatively, an visual effect similar to that obtained by the above process may be implemented by utilizing an effect applied to the hand objects HR and HL. Alternatively, the hand objects HR and HL may be deformed based on the reliability of the skeleton information. The display state (e.g., the degree of blurring, transparency, or color) of the image of the character CH (avatar) shown in FIGS. 21A and 21B may be changed based on the reliability of the skeleton information. An icon object that indicates a decrease in reliability may be displayed when the reliability of the skeleton information has decreased.

It is possible to easily notify the operator of a decrease in reliability of the hand operation by thus changing the display state of the hand objects HR and HL based on the reliability. For example, when the hands are positioned close to the trunk (see FIG. 20B), the hand objects HR and HL are blurred as shown in FIG. 21B. The operator who has observed the display state of the hand objects HR and HL stretches the arms as shown in FIG. 20A. Therefore, the operator inputs the operation information by moving the hands in a state in which the reliability of the skeleton information is high (FIG. 20A), so that a situation in which the operation of the operator is erroneously recognized can be prevented. This makes it possible to provide the operator with a comfortable operation interface environment that prevents an erroneous operation and the like.

An example in which the method according to one embodiment of the invention is applied to the game device has been mainly described above. Note that the method according to one embodiment of the invention may also be applied to various instruments other than the game device.

Figure 22A:
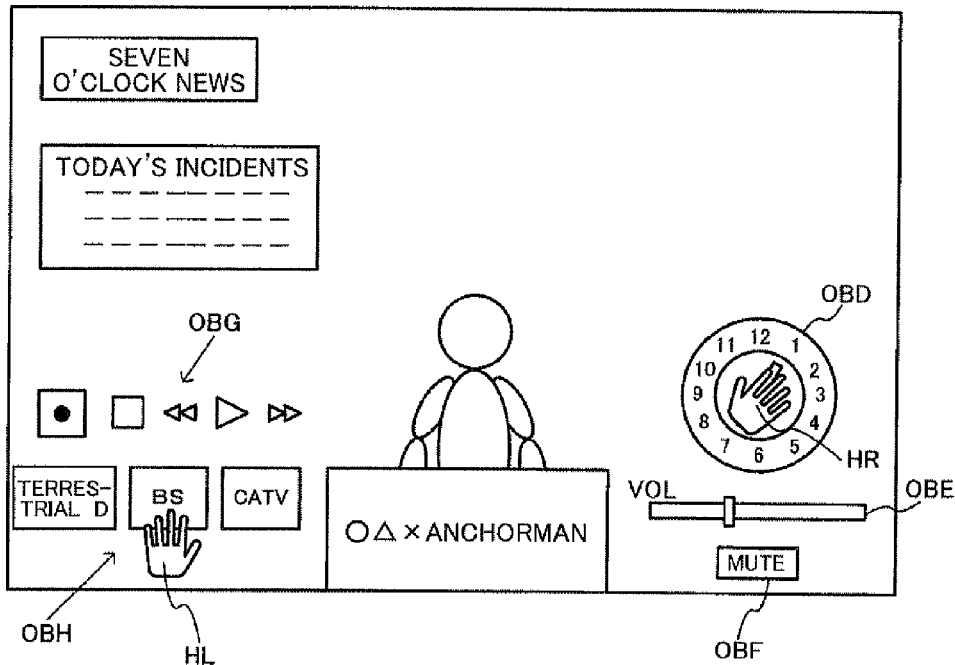
FIGS. 22A and 22B are views illustrative of an example in which a method according to one embodiment of the invention is applied to a visual instrument.

FIG. 22A shows an example in which the method according to one embodiment of the invention is applied to a television set (display device) (i.e., visual instrument). In FIG. 22A, operation objects OBD, OBE, OBF, OBG, and OBH are operation target objects of the operator. For example, the operation objects OBD, OBE, OBF, OBG, and OBH are used to issue an operation instruction to the visual instrument (or game device). Specifically, the operation objects OBD, OBE, OBF, OBG, and OBH are used to issue at least one of a content selection instruction, a given instrument operation instruction, and a content play/record instruction. For example, the operation objects OBD, OBE, and OBF are operation objects for channel selection (content selection in a broad sense), a volume operation (instrument operation selection in a broad sense), and a mute operation (instrument operation selection in a broad sense), respectively. The operation objects OBG and OH are operation objects for a content play/record operation (e.g., play, stop, fast-forward, rewind, or record) and a broadcasting type selection operation (e.g., terrestrial digital broadcasting or satellite broadcasting), respectively.

When the operator desires to change the channel, the operator stretches the arm toward the display section 190, and moves the hand object HR to the position of the operation object OBD for a channel operation. The operator then changes the channel by moving (rotating) the hand, and watches the desired broadcast program.

When the operator desires to adjust the volume, the operator stretches the arm toward the display section 190, and moves the hand object HR to the position of the operation object 013E for a volume operation. The operator then adjusts the volume by moving the hand to the right or left. When the operator desires to mute the sound, the operator stretches the arm toward the display section 190, and moves the hand object HR to the position of the operation object OBF for a mute operation. The operator then performs a press operation or the like to mute the sound. T operation objects OBG and OBH may be operated in the same manner as described above.

When the reliability of the skeleton information is high (e.g., the operator stretches the arms without crossing the right hand and the left hand), the operation objects OBD to OBH and the hand objects HR and HL are clearly displayed on the display section 190, as shown in FIG. 22A.

When the reliability of the skeleton information is high, the operator can operate the operation objects OBD to OBH by moving the hands or the like. Specifically, the operator can operate the operation object OBD for a channel operation or the operation object OBE for a volume operation by rotating the hand or moving the hand to the right or left.

Figure 22B:
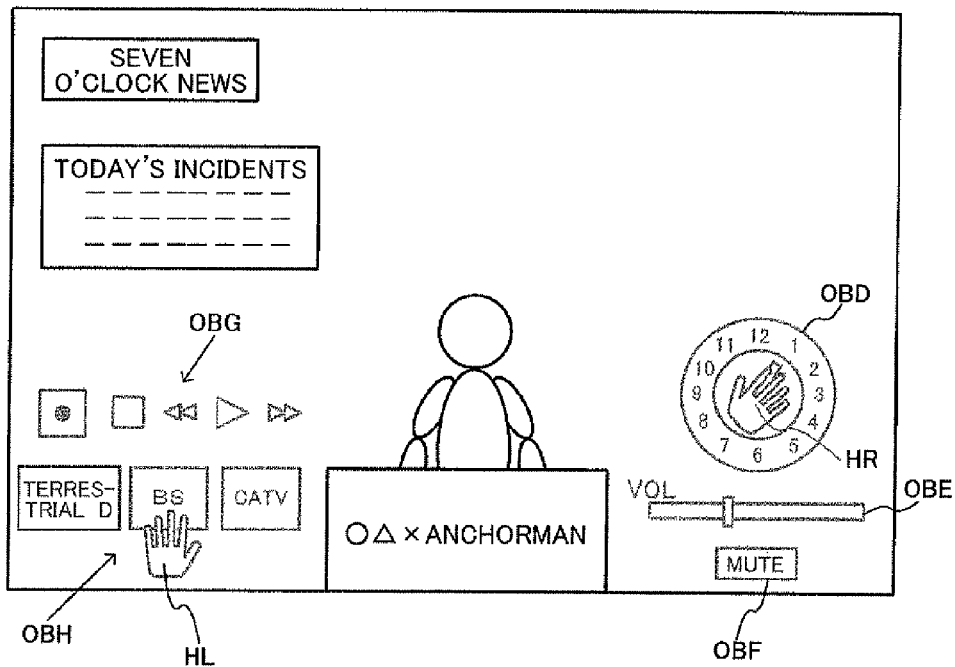

When the reliability of the skeleton information is low (e.g., the hands of the operator are positioned close to the trunk, or the operator crosses the arms), the operation objects OBD to OBH and the hand objects HR and HL are blurred or displayed (almost) transparently, as shown in FIG. 22B. Specifically, the display state of the operation objects OBD to OBH and the hand objects HR and HL is changed based on the reliability information. When the reliability is low, the operation objects OBD to OBH are blurred or displayed almost transparently.

When the reliability is low, the operation of the operator on the operation objects OBD to OBH is limited or prohibited. Specifically, the operator cannot operate the operation object OBD for a channel operation or the operation object OBE for a volume operation even if the operator rotates the hand or moves the hand to the right or left.

According to the above configuration, the operation objects OBD to OBH are displayed on the screen (see FIG. 22A) when the operator has stretched the aims, for example, and the operator can perform a content (image or sound) selection operation, an instrument operation, or a content play/record operation by operating the operation objects OBD to OBH.

When the operator has bent the arms at a position close to the trunk, the operation objects OBD to OBH are blurred or displayed transparently (see FIG. 22B). Therefore, the operation objects OBD to OBH are hardly observed on the screen, and the operator can enjoy watching the content (e.g., picture) without being disturbed.

According to one embodiment of the invention, when the reliability of the skeleton information is low, the operation of the operator on the operation objects OBD to OBH is limited or prohibited. When the reliability of the skeleton information is high, the operation of the operator on the operation objects OBD to OBH is allowed. This makes it possible to provide the operator with a novel operation interface environment.

When implementing an operation interface environment as shown in FIGS. 22A and 22B, the interface environment may be inconvenient to the operator if the moving range of the hand objects HR and HL differs between a case where the operator is an adult and a case where the operator is a child.

According to one embodiment of the invention, since the above correction process is performed, the moving range of the hand objects HR and HL can be set to an identical wide range irrespective of the individual operator. This makes it possible to provide the operator with a convenient interface environment, so that convenience to the operator can be improved.

Figure 23A:
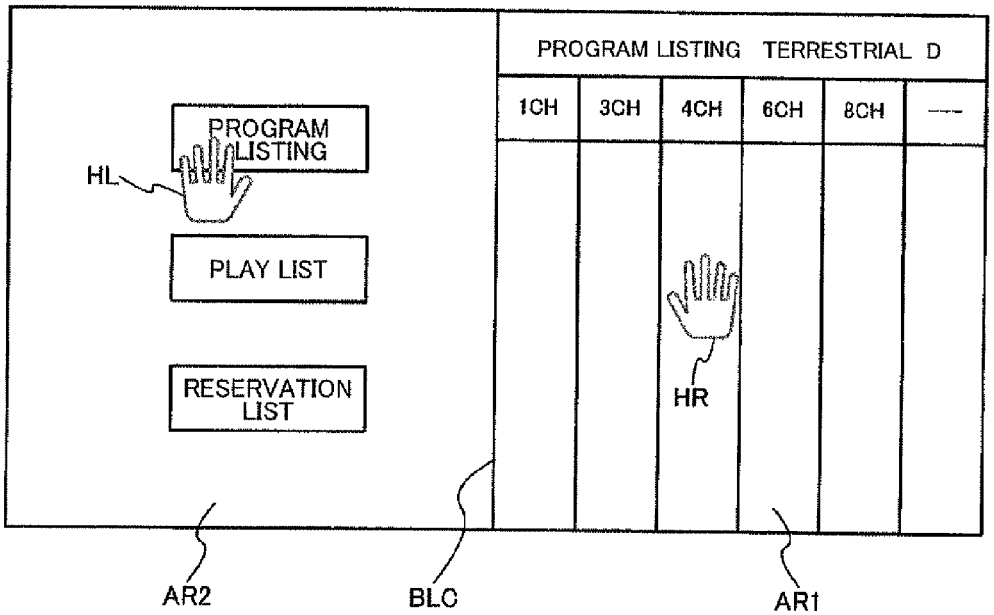
FIGS. 23A and 23B are views illustrative of an example in which a method according to one embodiment of the invention is applied to a visual instrument.
Figure 23B:
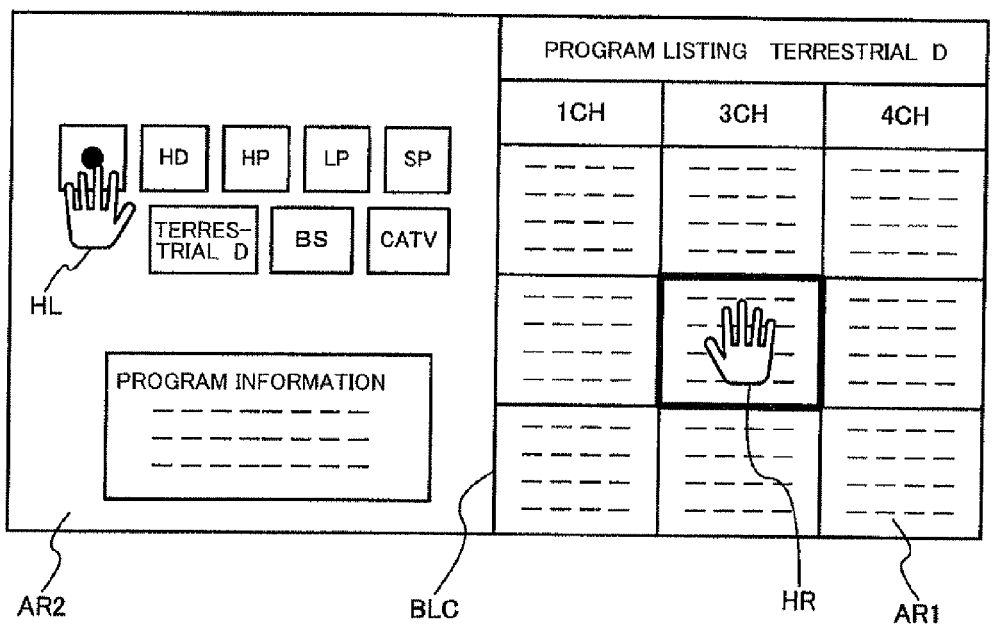

FIGS. 23A and 23B shows an example in which the method according to one embodiment of the invention is applied to a record/play instrument (e.g., HDD recorder or DVD recorder) (i.e., visual instrument). As shown in FIG. 23A, when the operator has selected a program listing using the left hand object HL in a state in which the operator does not stretch the arms, an outline of the program listing is displayed. In this case, the hand objects HR and HL are blurred or displayed almost transparently since the reliability is low.

In FIG. 23B, since the operator stretches the arms (i.e., the reliability is high), the hand objects HR and HL are clearly displayed. The details of the program listing are displayed, and the operator can select a program included in the program listing using the right hand object HR, and select recording of the program using the left hand object HL, for example. The operator can also select the recording image quality (HD, HP, LP, or SP) and the broadcast program type (terrestrial digital broadcasting, satellite broadcasting, or CATV) using the left hand object HL. The details of the program selected using the right hand object HR are also displayed.

In FIGS. 23A and 23B, a first movement area AR1 (right hand movement area), and a second movement area AR2 (left hand movement area) are provided. A movement limiting boundary BLC is set between the movement areas AR1 and AR2.

Figure 24A:
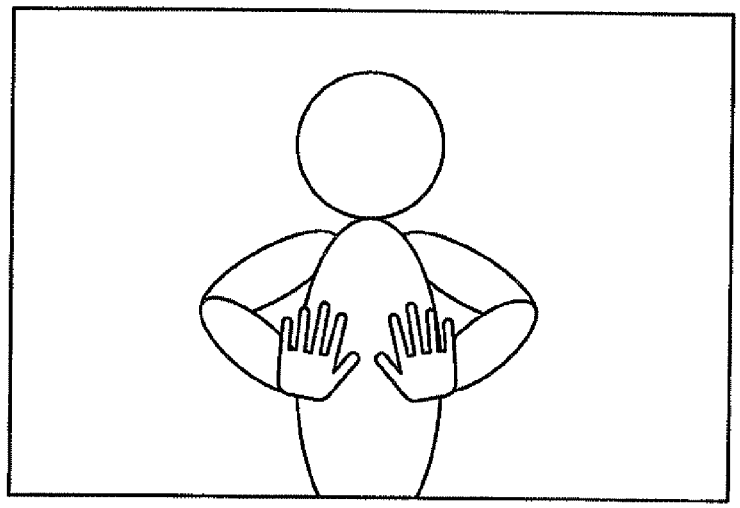
FIGS. 24A and 24B are views showing an operation motion made by an operator.

Therefore, the operator shown in FIG. 24A can move the right hand object HR in the right movement area AR1 (see FIGS. 23A and 23B), and issue various operation instructions assigned to the movement area AR1 (first operation area) by moving the right hand. The operator can also move the left hand object HL in the left movement area AR2, and issue various operation instructions assigned to the movement area AR2 (second operation area) by moving the left hand.

Figure 24B:
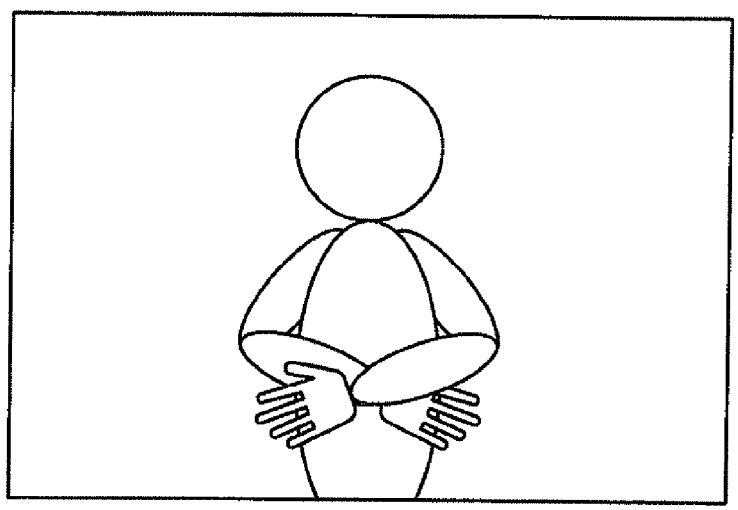

In FIGS. 23A and 23B, the movement limiting boundary BLC is provided between the movement areas AR1 and AR2. This makes it possible to prevent a situation in which the right hand object HR enters the left movement area AR2, or the left hand object HL enters the right movement area AR1, even if the operator has made an inappropriate motion (e.g., has crossed the arms (see FIG. 24B)).

When the operator has crossed the arms (see FIG. 2413), the reliability information about the right hand and the left hand decreases, and the display state of the hand objects HR and HL is changed (e.g., the hand objects HR and HL are blurred) (see FIG. 23A). Therefore, the operator can promptly and easily determine that the operator has made an inappropriate motion (see FIG. 24B). This makes it possible to provide the operator with an improved operation interface environment.

2.5 Specific Processing Example

Figure 25:
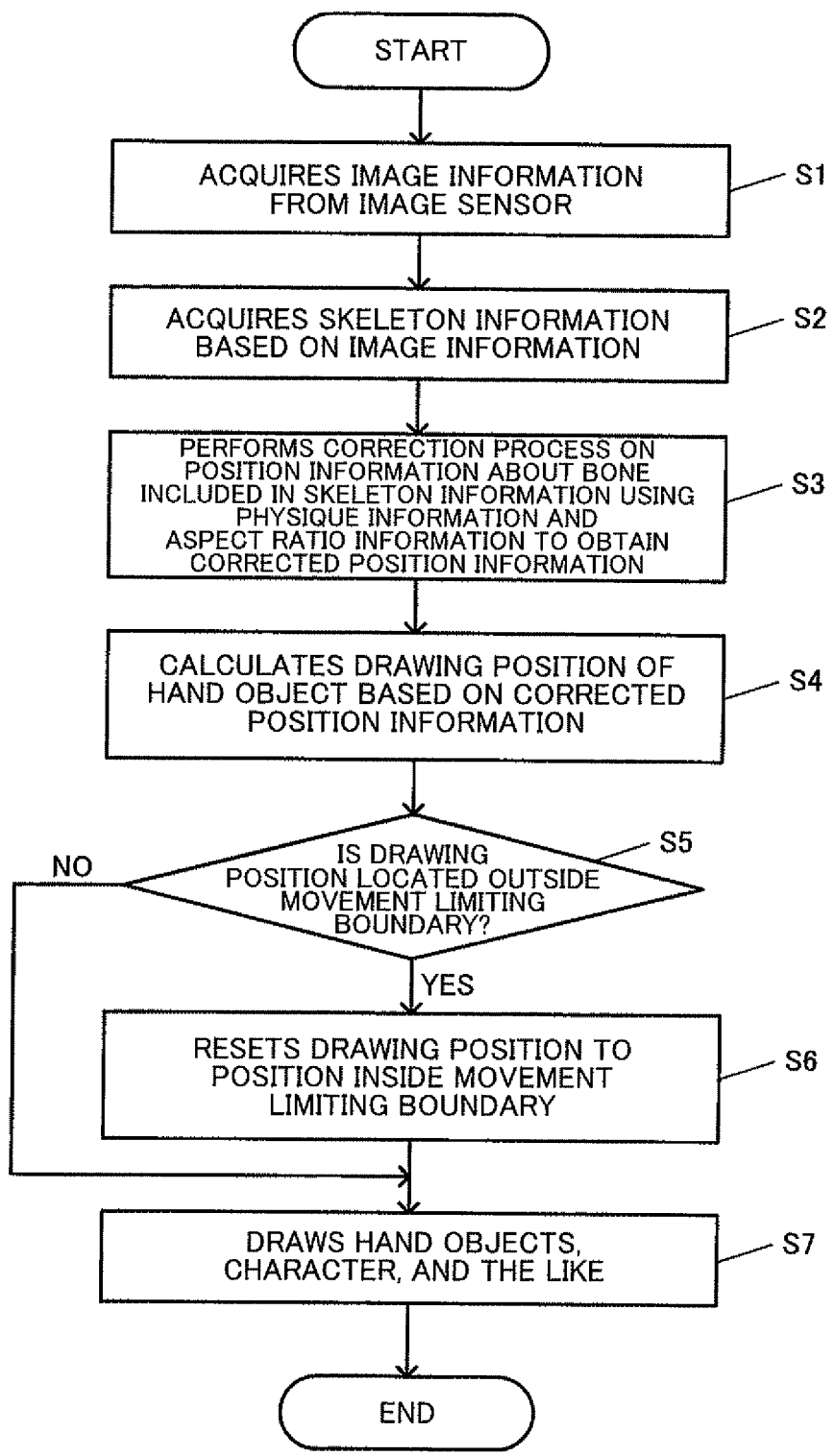
FIG. 25 is a flowchart illustrative of a process according to one embodiment of the invention.

A specific processing example according to one embodiment of the invention is described below using flowcharts shown in FIGS. 25 and 26. FIG. 25 is a flowchart showing a specific example of the process that controls the movement of the object using the movement limiting boundary, and generates an image.

The image information is acquired from the image sensor, as described with reference to FIGS. 2A and 2B (step S1). The skeleton information is then acquired based on the image information, as described with reference to FIG. 3 (step S2).

The correction process is then performed on the position information about the bone included in the skeleton information using the physique information and aspect ratio information to obtain the corrected position information, as described with reference to FIGS. 12A to 16B, for example (step S3). The drawing position of the hand object is then calculated based on the corrected position information (step S4).

Whether or not the drawing position is located outside the movement limiting boundary is then determined (step S5). When the drawing position is located outside the movement limiting boundary, the drawing position is reset to a position inside the movement limiting boundary using the method described with reference to FIG. 9, for example (step S6). The hand objects, the character, and the like are drawn based on the drawing position and the like (step S7).

Figure 26:
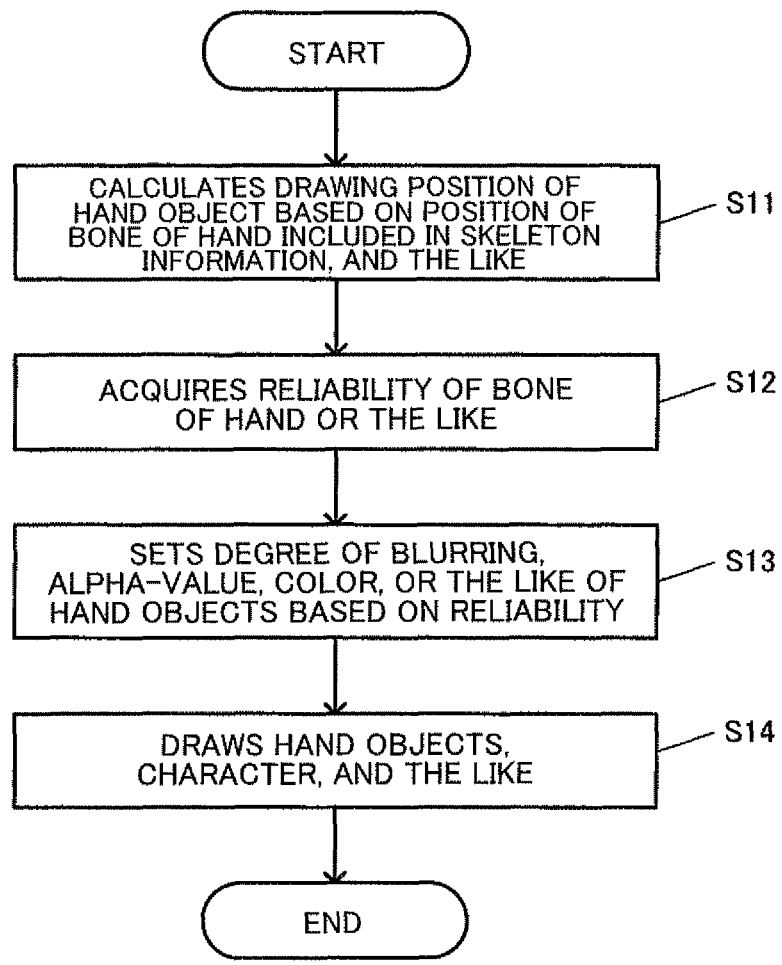
FIG. 26 is a flowchart illustrative of a process according to one embodiment of the invention.

FIG. 26 is a flowchart showing a specific example of the process that changes the display state of an image using the reliability information.

The drawing position of the hand object is calculated based on the position of the bone (joint) of the hand included in the skeleton information, and the like (step S11). The reliability of the bone of the hand or the like is then acquired (step S12).

The degree of blurring, the α-value, the color, or the like of the hand objects is set based on the acquired reliability (step S13). The hand objects, the character, and the like for which the degree of blurring, the α-value, the color, or the like has been set, are then drawn (step S147). The display state of the image can thus be changed as shown in FIGS. 21A and 21B.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., skeleton information, hand, or hand object) cited with a different term (e.g., motion information, given part, or object) having a broader meaning or the same meaning at least once in the specification and the drawings may be replaced by the different term in any place in the specification and the drawings. The object control method that uses the movement limiting boundary, the method of limiting the movement of the object, the skeleton information acquisition method, the skeleton information correction method, the reliability information acquisition method, the method of changing the display state of an image, and the like are not limited to those described in connection with the above embodiments. Methods equivalent to the above methods are intended to be included within the scope of the invention. The invention may be applied to various games. The invention may be applied to various image generation systems such as an arcade game system, a consumer game system, a large-scale attraction system in which a number of players participate, a simulator, a multimedia terminal, a system board that generates a game image, a mobile phone, a visual instrument, an audio instrument, and a home electric appliance.

What is claimed is:

1. An image generation apparatus comprising:
an image information acquisition section that acquires image information from an image sensor;
a motion information acquisition section that acquires motion information about an operator based on the image information from the image sensor;
an object control section that moves an object based on the motion information about the operator, the object corresponding to at least one of a first object in a first movement area and a second object in a second movement area; and
an image generation section that generates an image displayed on a display section, the first movement area and the second movement area being displayed on a same display screen of the display section,
the object control section setting an in-screen movement limiting boundary that is set between the first movement area and the second movement area and that limits movement of the first object and the second object so that the first object and the second object do not move beyond the in-screen movement limiting boundary even when it has been determined that the first object or second object has moved beyond the in-screen movement limiting boundary based on the motion information,
the object control section setting an outside-edge movement limiting boundary outside the edge of the screen a distance less than a width of the first object and second object, the outside-edge movement limiting boundary limiting movement of the objects so that the objects do not move beyond the outside-edge movement limiting boundary, and each of the boundaries limiting movement by preventing the first and second objects from moving beyond their respective areas regardless of the motion information of the operator.

2. The image generation apparatus as defined in claim 1, the object control section limiting movement of the object so that the object does not move beyond the movement limiting boundary that is set corresponding to a plurality of contact target objects that are contact targets of the object.

3. The image generation apparatus as defined in claim 2, the plurality of contact target objects being disposed in an object side area with respect to the movement limiting boundary; and
the object control section limiting movement of the object so that the object does not move beyond the movement limiting boundary that is set to be circumscribed to the plurality of contact target objects.

4. The image generation apparatus as defined in claim 1, the object control section controlling movement of the first object in the first movement area based on the motion information about a first part of the operator, and controlling movement of the second object in the second movement area based on the motion information about a second part of the operator.

5. The image generation apparatus as defined in claim 1, the object control section limiting movement of the object so that the object does not move beyond a screen-edge movement limiting boundary provided corresponding to an edge of a screen of the display section.

6. The image generation apparatus as defined in claim 5, the screen-edge movement limiting boundary being provided outside the edge of the screen.

7. The image generation apparatus as defined in claim 6, a distance between the screen-edge movement limiting boundary and the edge of the screen being smaller than a width of the object.

8. The image generation apparatus as defined in claim 1, the motion information acquisition section acquiring skeleton information that specifies a motion of the operator as the motion information; and
the object control section moving the object in the movement area based on the skeleton information.

9. The image generation apparatus as defined in claim 8, further comprising:
a correction section that performs a correction process on position information about a bone of a skeleton indicated by the skeleton information,
the object control section controlling the object based on a result of the correction process.

10. The image generation apparatus as defined in claim 9, the correction section performing the correction process on the position information about the bone of the skeleton to obtain corrected position information;
the object control section controlling the object based on the corrected position information; and
the image generation section generating an image so that the object is displayed at a display position on a screen corresponding to the corrected position information.

11. The image generation apparatus as defined in claim 9, the correction section performing the correction process so that a display position of the object when a skeleton of a first operator is in a first state is identical with a display position of the object when a skeleton of a second operator is in the first state.

12. The image generation apparatus as defined in claim 9, the correction section performing the correction process using physique information about the operator.

13. The image generation apparatus as defined in claim 8, further comprising:
a reliability information acquisition section that acquires reliability information that indicates reliability of the skeleton information,
the image generation section generating an image corresponding to the acquired reliability information as the image displayed on the display section.

14. The image generation apparatus as defined in claim 13, the image generation section changing a display state of the image displayed on the display section based on the reliability information.

15. An image generation method comprising:
acquiring image information from an image sensor;
acquiring motion information about an operator based on the image information from the image sensor;
moving an object in a movement area based on the motion information about the operator, the object corresponding to at least one of a first object in a first movement area and a second object in a second movement area;
generating an image displayed on a display section, the first movement area and the second movement area being displayed on a same display screen of the display section;
setting an in-screen movement limiting boundary between the first movement area and the second movement area, the in-screen movement limiting boundary limiting movement of the first object and the second object so that the first object and the second object do not move beyond the in-screen movement limiting boundary even when it has been determined that the first object or second object has moved beyond the in-screen movement limiting boundary based on the motion information;
setting an outside-edge movement limiting boundary outside the edge of the screen a distance less than a width of the first object and second object, the outside-edge movement limiting boundary limiting movement of the objects so that the objects do not move beyond the outside-edge movement limiting boundary, each of the boundaries limiting movement by preventing the first and second objects from moving beyond their respective areas regardless of the motion information of the operator; and
controlling movement of the first object in the first movement area based on the motion information about a first part of the operator, and controlling movement of the second object in the second movement area based on the motion information about a second part of the operator.

16. A non-transitory computer-readable information storage medium storing a program that causes a computer to execute image generation steps, the program comprising instructions for:
acquiring image information from an image sensor;
acquiring motion information about an operator based on the image information from the image sensor;
moving an object in a movement area based on the motion information about the operator, the object corresponding to at least one of a first object in a first movement area and a second object in a second movement area;
generating an image displayed on a display section, the first movement area and the second movement area being displayed on a same display screen of the display section;
setting an in-screen movement limiting boundary between the first movement area and the second movement area, the in-screen movement limiting boundary limiting movement of the first object and the second object so that the first object and the second object do not move beyond the in-screen movement limiting boundary even when it has been determined that the first object or second object has moved beyond the in-screen movement limiting boundary based on the motion information;
setting an outside-edge movement limiting boundary outside the edge of the screen a distance less than a width of the first object and second objects, the outside-edge movement limiting boundary limiting movement of the objects so that the objects do not move beyond the outside-edge movement limiting boundary, each of the boundaries limiting movement by preventing the first and second objects from moving beyond their respective areas regardless of the motion information of the operator; and
controlling movement of the first object in the first movement area based on the motion information about a first part of the operator, and controlling movement of the second object in the second movement area based on the motion information about a second part of the operator.

* * * * *